United States Patent
Heide et al.

(10) Patent No.: US 7,403,833 B2
(45) Date of Patent: Jul. 22, 2008

(54) METHOD FOR OPTIMIZING SPATIAL ORIENTATIONS OF COMPUTER-AIDED DESIGN MODELS

(75) Inventors: Erik K. Heide, Eden Prairie, MN (US); Donald J. Holzwarth, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 105 days.

(21) Appl. No.: 11/396,792

(22) Filed: Apr. 3, 2006

(65) Prior Publication Data

US 2007/0233298 A1    Oct. 4, 2007

(51) Int. Cl.
*G06F 19/00* (2006.01)
(52) U.S. Cl. .......................... 700/119; 700/194
(58) Field of Classification Search ............. 700/95–98, 700/117–120, 182, 194, 251; 706/919; 715/964; 708/442; 345/649–659
See application file for complete search history.

(56) References Cited

U.S. PATENT DOCUMENTS

| | | | |
|---|---|---|---|
| 4,575,330 A | 3/1986 | Hull | |
| 4,665,492 A | 5/1987 | Masters | |
| 4,749,347 A | 6/1988 | Valavaara | |
| 4,961,154 A | 10/1990 | Pomerantz et al. | |
| 5,059,266 A | 10/1991 | Yamane et al. | |
| 5,121,329 A | 6/1992 | Crump | |
| 5,134,569 A | 7/1992 | Masters | |
| 5,136,515 A | 8/1992 | Helinski | |
| 5,169,081 A | 12/1992 | Goedderz | |
| 5,204,055 A | 4/1993 | Sachs et al. | |
| 5,208,763 A * | 5/1993 | Hong et al. | ................... 702/95 |
| 5,216,616 A | 6/1993 | Masters | |
| 5,257,657 A | 11/1993 | Gore | |
| 5,263,130 A | 11/1993 | Pomerantz et al. | |
| 5,303,141 A | 4/1994 | Batchelder et al. | |
| 5,325,472 A * | 6/1994 | Horiuchi et al. | ............. 345/427 |
| 5,340,433 A | 8/1994 | Crump | |
| 5,402,351 A | 3/1995 | Batchelder et al. | |
| 5,426,722 A | 6/1995 | Batchelder | |
| 5,474,719 A | 12/1995 | Fan et al. | |
| 5,491,643 A | 2/1996 | Batchelder | |
| 5,503,785 A | 4/1996 | Crump et al. | |
| 5,557,714 A * | 9/1996 | Lines et al. | ................. 345/653 |

(Continued)

FOREIGN PATENT DOCUMENTS

| JP | 60-168615 A | 9/1985 |
|---|---|---|
| JP | 63-141725 A | 6/1988 |

OTHER PUBLICATIONS

Kodama, "Automatic Method for Fabricating a Three-Dimensional Plastic Model with Photo-Hardening Polymer", Rev. Sci. Instrum. 52(11), Nov. 1981.

(Continued)

*Primary Examiner*—M. N. Von Buhr
(74) *Attorney, Agent, or Firm*—Kinney & Lange, P.A.

(57) ABSTRACT

A method and system for building one or more three-dimensional objects, where the method includes providing a computer-aided design model of a three-dimensional object having an initial spatial orientation in a coordinate system, and determining an optimal spatial orientation of the computer-aided design model in the coordinate system based on one or more criteria.

21 Claims, 26 Drawing Sheets

U.S. PATENT DOCUMENTS

| | | | |
|---|---|---|---|
| 5,587,913 A | 12/1996 | Abrams et al. | |
| 5,594,652 A | 1/1997 | Penn et al. | |
| 5,653,925 A | 8/1997 | Batchelder | |
| 5,695,707 A | 12/1997 | Almquist et al. | |
| 5,701,403 A * | 12/1997 | Watanabe et al. | 345/419 |
| 5,738,817 A | 4/1998 | Danforth et al. | |
| 5,807,437 A | 9/1998 | Sachs et al. | |
| 5,866,058 A | 2/1999 | Batchelder et al. | |
| 5,900,207 A | 5/1999 | Danforth et al. | |
| 5,943,235 A | 8/1999 | Earl et al. | |
| 6,022,207 A | 2/2000 | Dahlin et al. | |
| 6,028,410 A | 2/2000 | Leavitt et al. | |
| 6,054,077 A | 4/2000 | Comb et al. | |
| 6,073,056 A * | 6/2000 | Gawronski et al. | 700/98 |
| 6,112,109 A * | 8/2000 | D'Urso | 600/407 |
| 6,129,872 A | 10/2000 | Jang | |
| 6,165,406 A | 12/2000 | Jang et al. | |
| 6,175,422 B1 | 1/2001 | Penn et al. | |
| 6,193,923 B1 | 2/2001 | Leyden et al. | |
| 6,214,279 B1 | 4/2001 | Yang et al. | |
| 6,228,923 B1 | 5/2001 | Lombardi et al. | |
| 6,323,859 B1 * | 11/2001 | Gantt | 345/419 |
| 6,367,791 B1 | 4/2002 | Calderon et al. | |
| 6,490,496 B1 | 12/2002 | Dacey | |
| 6,560,500 B2 * | 5/2003 | St. Ville | 700/98 |
| 6,572,807 B1 | 6/2003 | Fong | |
| 6,600,965 B1 | 7/2003 | Hull et al. | |
| 6,629,011 B1 | 9/2003 | Calderon et al. | |
| 6,645,412 B2 | 11/2003 | Priedeman, Jr. et al. | |
| 6,685,866 B2 | 2/2004 | Swanson et al. | |
| 6,730,252 B1 | 5/2004 | Teoh et al. | |
| 6,813,594 B2 | 11/2004 | Guertin et al. | |
| 6,823,230 B1 | 11/2004 | Jamalabad et al. | |
| 6,898,477 B2 | 5/2005 | Loughran | |
| 6,907,307 B2 | 6/2005 | Chen et al. | |
| 6,936,212 B1 | 8/2005 | Crawford | |
| 7,024,272 B2 * | 4/2006 | Thomas et al. | 700/182 |
| 7,184,044 B2 * | 2/2007 | Chin et al. | 345/427 |
| 2002/0011693 A1 | 1/2002 | Leyden et al. | |
| 2002/0123812 A1 * | 9/2002 | Jayaram et al. | 700/98 |
| 2003/0076371 A1 | 4/2003 | Fong | |
| 2004/0006405 A1 | 1/2004 | Chen et al. | |
| 2004/0075196 A1 | 4/2004 | Leyden et al. | |
| 2005/0103360 A1 | 5/2005 | Tafoya | |
| 2006/0001190 A1 | 1/2006 | Priedeman, Jr. et al. | |
| 2006/0106485 A1 * | 5/2006 | Landers et al. | 700/182 |
| 2006/0155418 A1 * | 7/2006 | Bradbury et al. | 700/182 |

OTHER PUBLICATIONS

"The World of Rapid Prototyping", by Terry Wohlers, *Proceedings of the Fourth International Conference on Desktop Manufacturing*, Sep. 24-25, 1992, San Jose, CA.

"Rapid Prototyping: An Update on RP Applications Technology Improvements, and Developments in the Industry", by Terry T. Wohlers, Wohlers Associates, Copyright 1991.

"Installing a Rapid Prototyping System The Economic and Organizational Issues", by Terry T. Wohlers, Wohlers Associates, Copyright 1991.

"Chrysler Compares Rapid Prototyping Systems", by Terry Wohlers, *Computer-Aided Engineering*, vol. 11, No. 10, Oct. 1992.

"CAD Meets Rapid Prototyping", by Terry Wohlers, *Computer-Aided Engineering*, vol. 11, No. 4, Apr. 1992.

\* cited by examiner

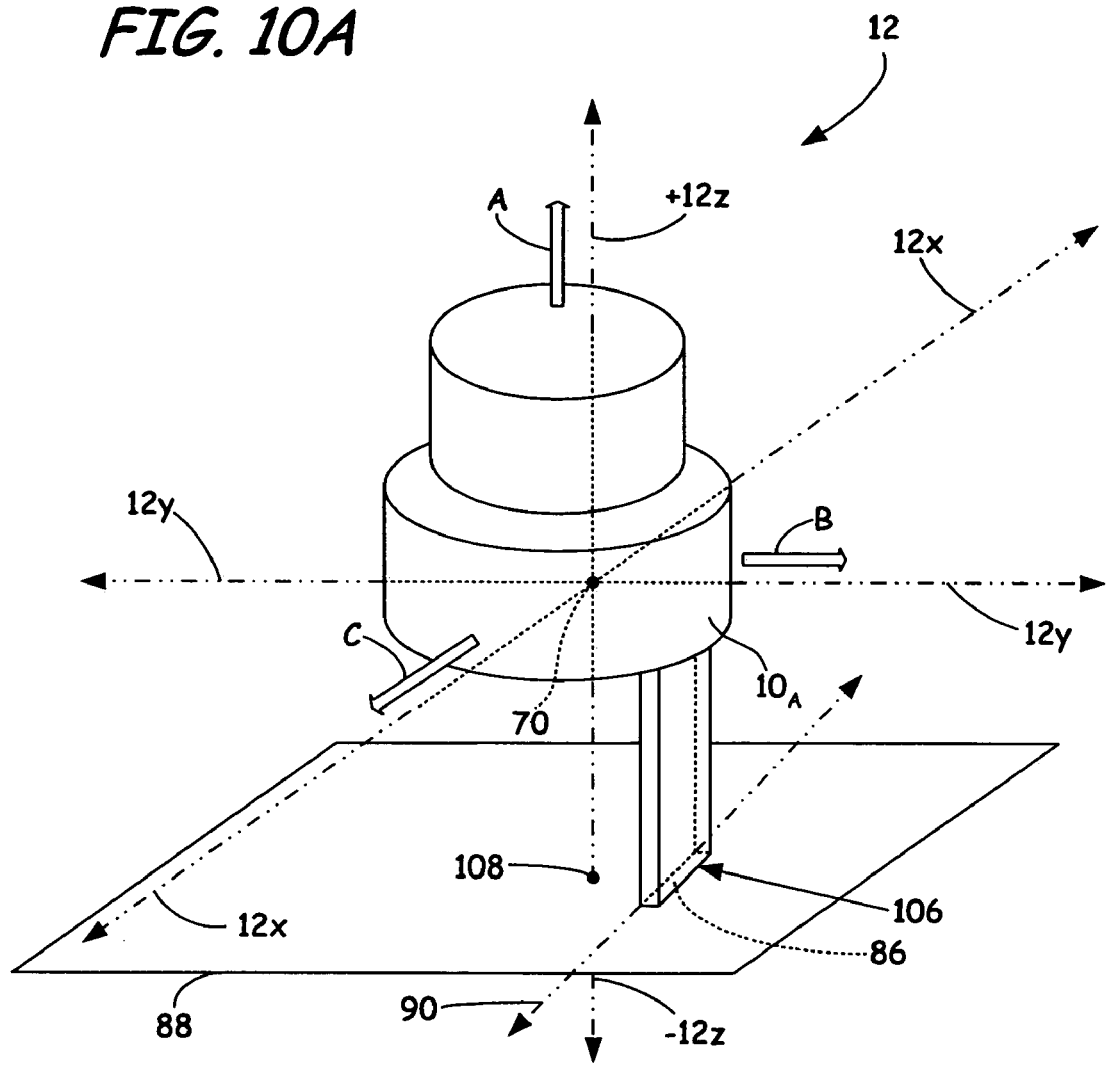

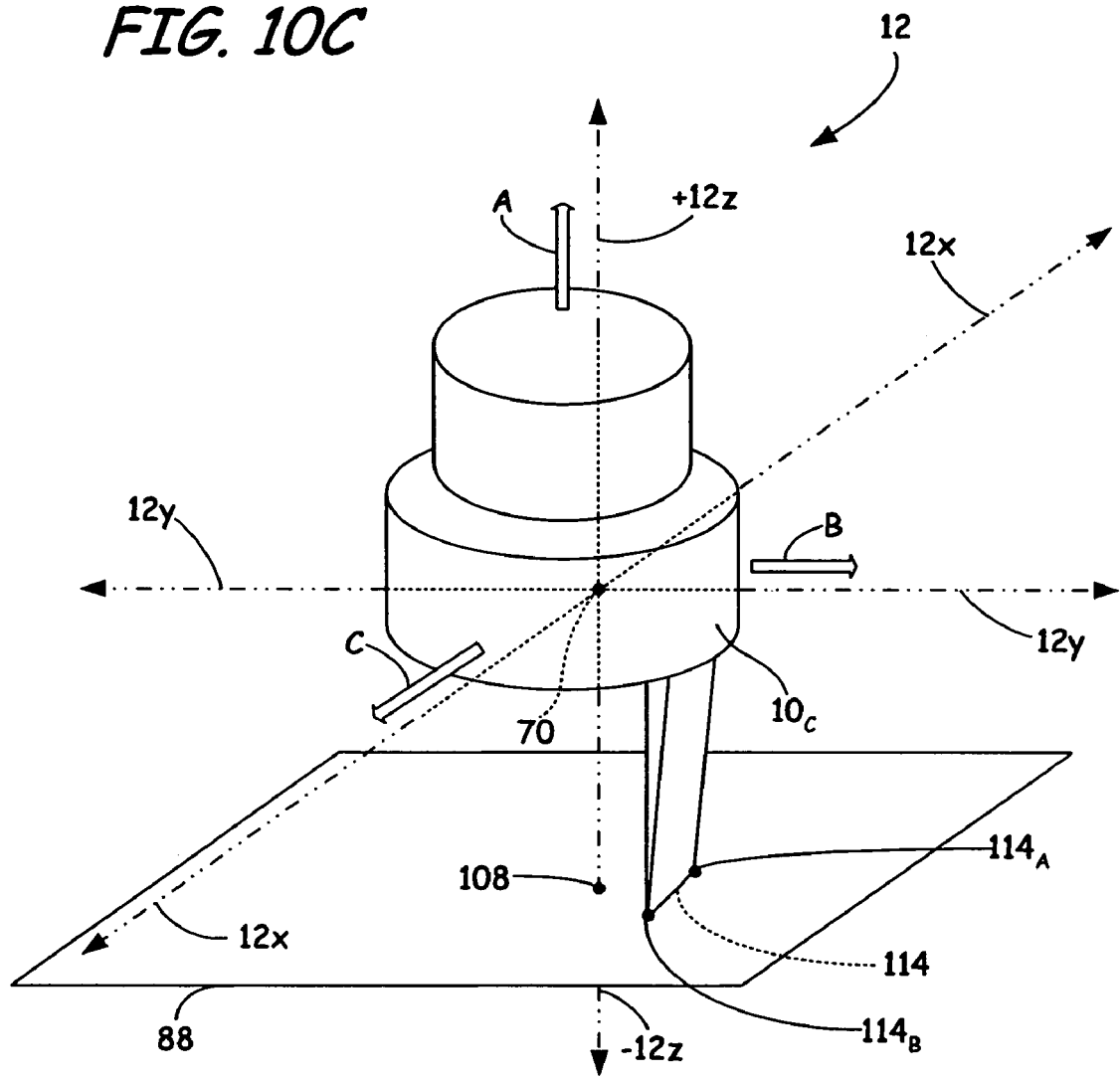

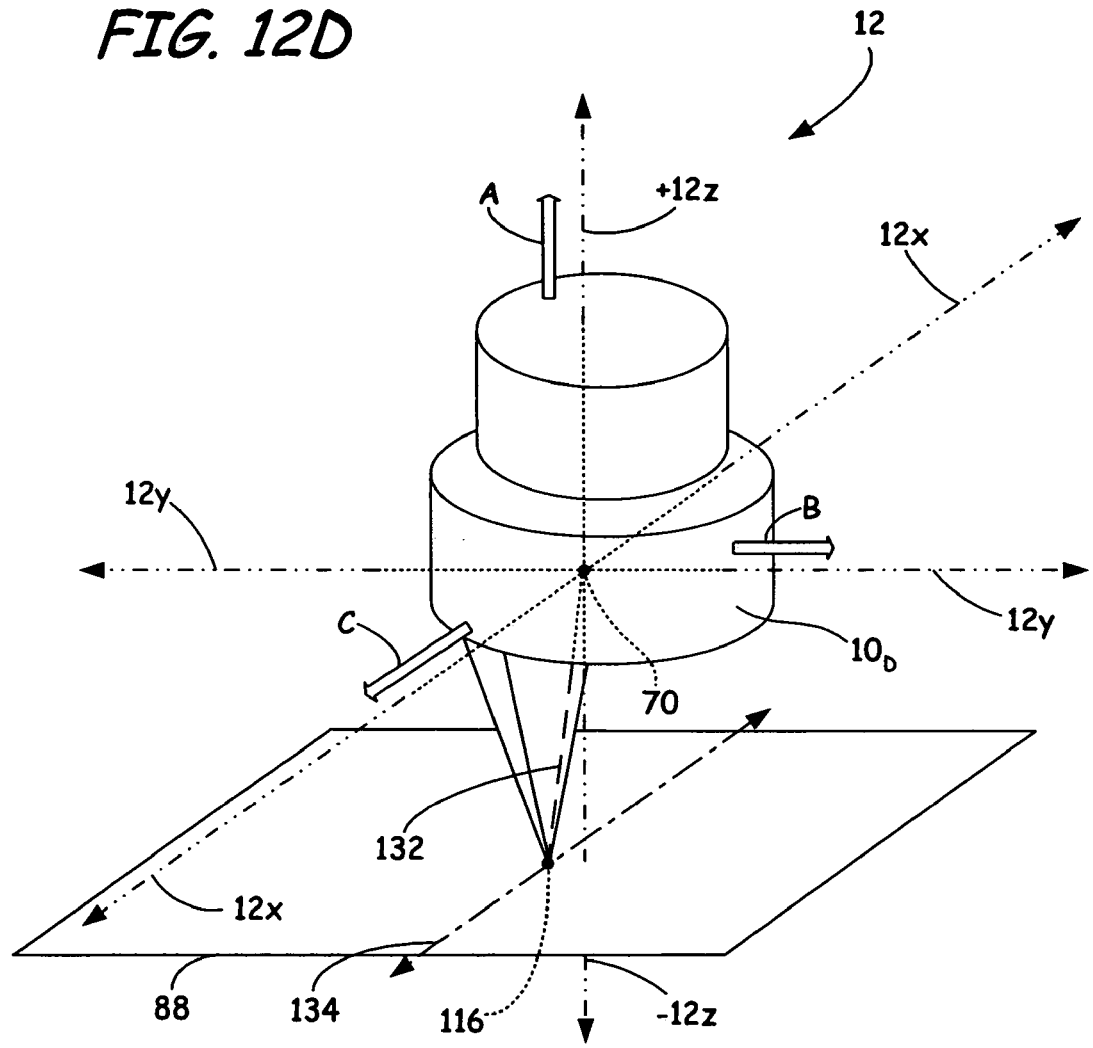

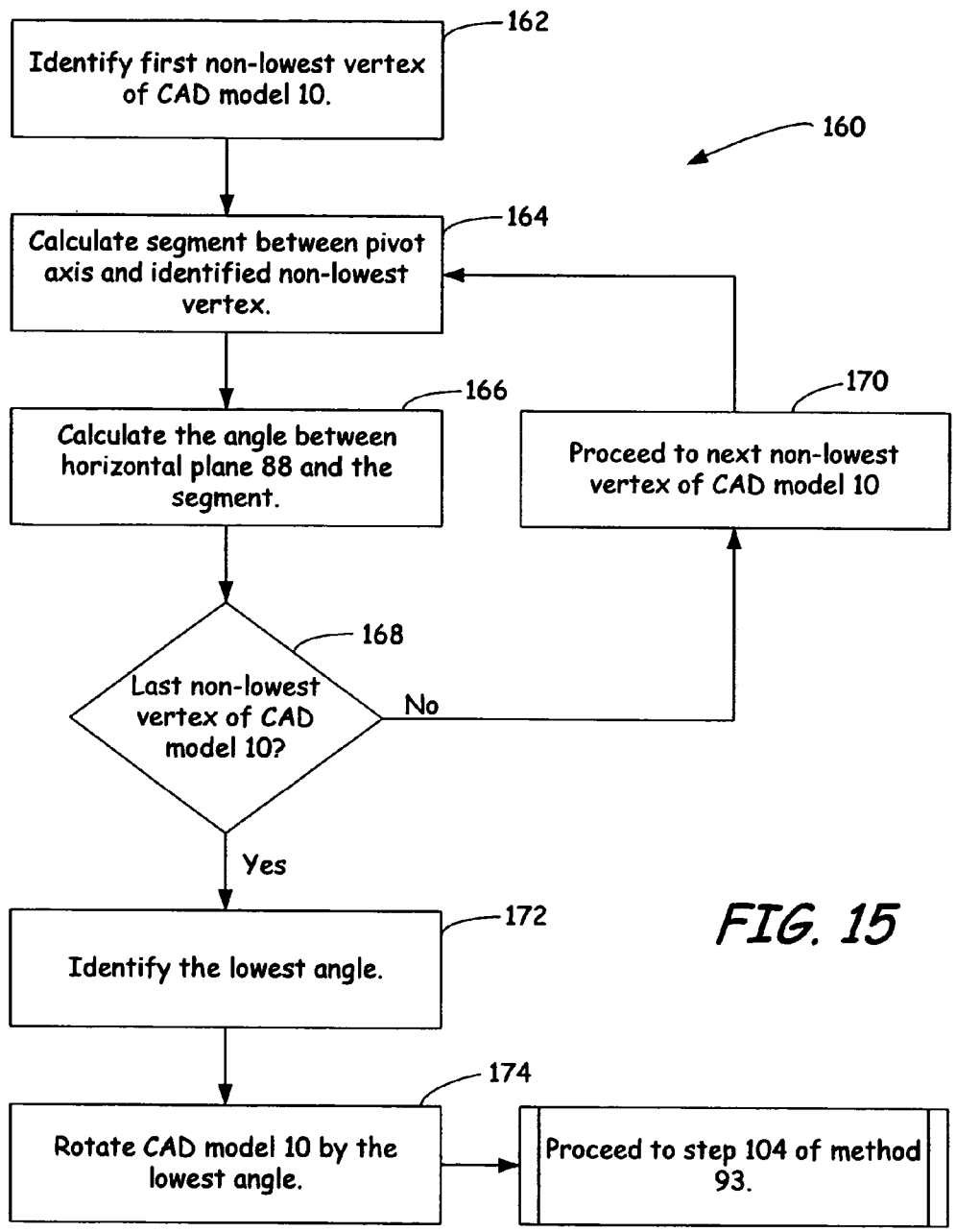

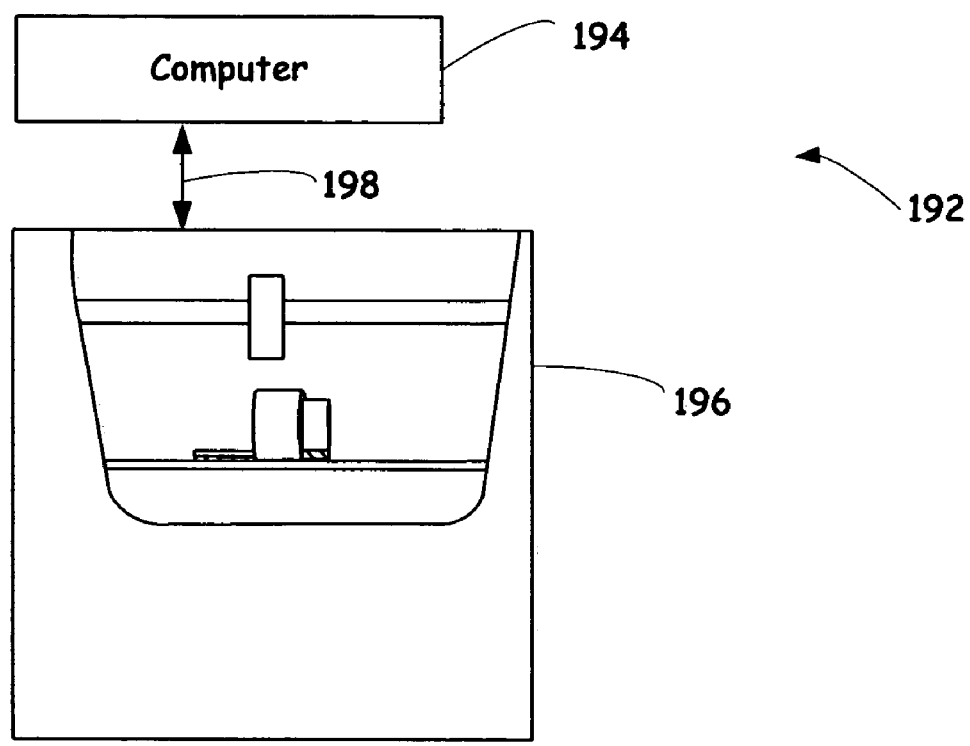

METHOD FOR OPTIMIZING SPATIAL ORIENTATIONS OF COMPUTER-AIDED DESIGN MODELS

BACKGROUND OF THE INVENTION

The present invention relates to the rapid manufacturing of three-dimensional (3D) objects such as prototypes, tooling, and production-quality parts, based on computer-aided design (CAD) models. In particular, the present invention relates to a method for optimizing spatial orientations of CAD models to improve build performance during rapid manufacturing.

The production and testing of 3D objects is commonly used for developing new products, machines, and processes in a wide range of industries. There are a variety of rapid manufacturing techniques for building 3D objects, each of which develop 3D objects from CAD models under computer control. The term "rapid manufacturing" herein refers to the building of 3D objects by one or more layer-based additive techniques. Exemplary rapid manufacturing techniques include fused deposition modeling, ink jetting, selective laser sintering, electron-beam melting, and stereolithographic processes.

A CAD model is a geometric computer model of a 3D object that has a given spatial orientation in a Cartesian coordinate system (i.e., x-y-z coordinate system). The rapid manufacturing techniques typically slice the CAD model into horizontal layers based on the given spatial orientation, and then build the 3D object layer-by-layer by repetitive application of materials. Consequentially, the 3D object is built in the same spatial orientation as the CAD model. However, the spatial orientation of the CAD model is not necessarily optimal for build performance.

BRIEF SUMMARY OF THE INVENTION

The present invention relates to a method, and system that performs the method, for building one or more 3D objects from a CAD model having an initial spatial orientation in a coordinate system. The method includes determining an optimal spatial orientation of the CAD model in the coordinate system based on one or more criteria. The criteria relate to factors for improving build performance during rapid manufacturing.

BRIEF DESCRIPTION OF THE DRAWINGS

FIG. 10A is a perspective view of the CAD model having an axially-aligned orientation in the Cartesian coordinate system.

FIG. 10C is a perspective view of a second alternative CAD model having an axially-aligned orientation in the Cartesian coordinate system.

FIG. 12D is a perspective view of the third alternative CAD model having an axially-aligned orientation in the Cartesian coordinate system.

FIG. 15 is a block diagram of a method for rotating the CAD model from the axially-aligned orientation shown in FIG. 14A to the stable orientation shown in FIG. 14B.

FIG. 17 is a flow diagram of a system for building 3D objects pursuant to the method of the present invention.

DETAILED DESCRIPTION

Figure 1:
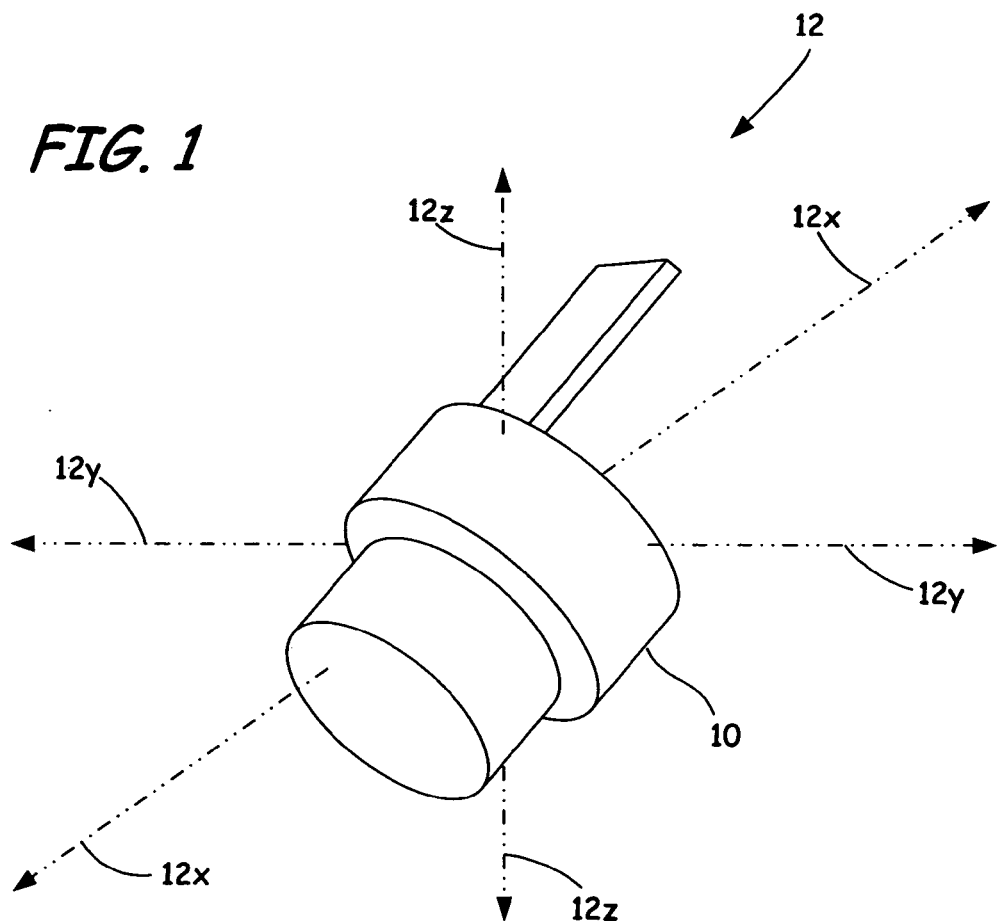
FIG. 1 is a perspective view of a CAD model of a 3D object spatially oriented in a Cartesian coordinate system.

FIG. 1 is a perspective view of CAD model 10 located within coordinate system 12, where CAD model 10 is a geometric computer model of a 3D object (e.g., STL file).

Coordinate system 12 is a Cartesian coordinate system that represents an area in which CAD model 10 is spatially oriented. In alternative embodiments, other coordinate systems may be used (e.g., cylindrical coordinate systems). Coordinate system 12 includes x-axis 12x, y-axis 12y, and z-axis 12z, where axes 12x and 12y define a horizontal x-y plane, and axis 12z defines a vertical axis orthogonal to the horizontal x-y plane. CAD model 10 is spatially oriented in coordinate system 12 such that axes 12x, 12y, and 12z generally intersect at a central location of CAD model 10.

Prior to optimizing the spatial orientation of CAD model 10 using the method of the present invertion, the spatial orientation of CAD model 10 in coordinate system 12 is referred to as an "initial spatial orientation". Typically this refers to the spatial orientation of a given CAD model (e.g., CAD model 10) when the computer-based file is last saved, but may also include default spatial orientations, and any other manual or automatic pre-positioning of the CAD model. Accordingly, CAD model 10 may be provided in any initial spatial orientation in coordinate system 12.

While the initial spatial orientation may be a useful orientation for viewing a CAD model on a computer monitor, it is not necessarily an optimal orientation for build performance with a particular rapid manufacturing system. As a result, building a 3D object based on a CAD model in the initial spatial orientation may undesirably reduce build performance, (e.g., increasing build times and material costs). Accordingly, as discussed below, the method of the present invention may be used to optimize the spatial orientations of CAD models (e.g., CAD model 10) to improve build performance during rapid manufacturing.

Figure 2:
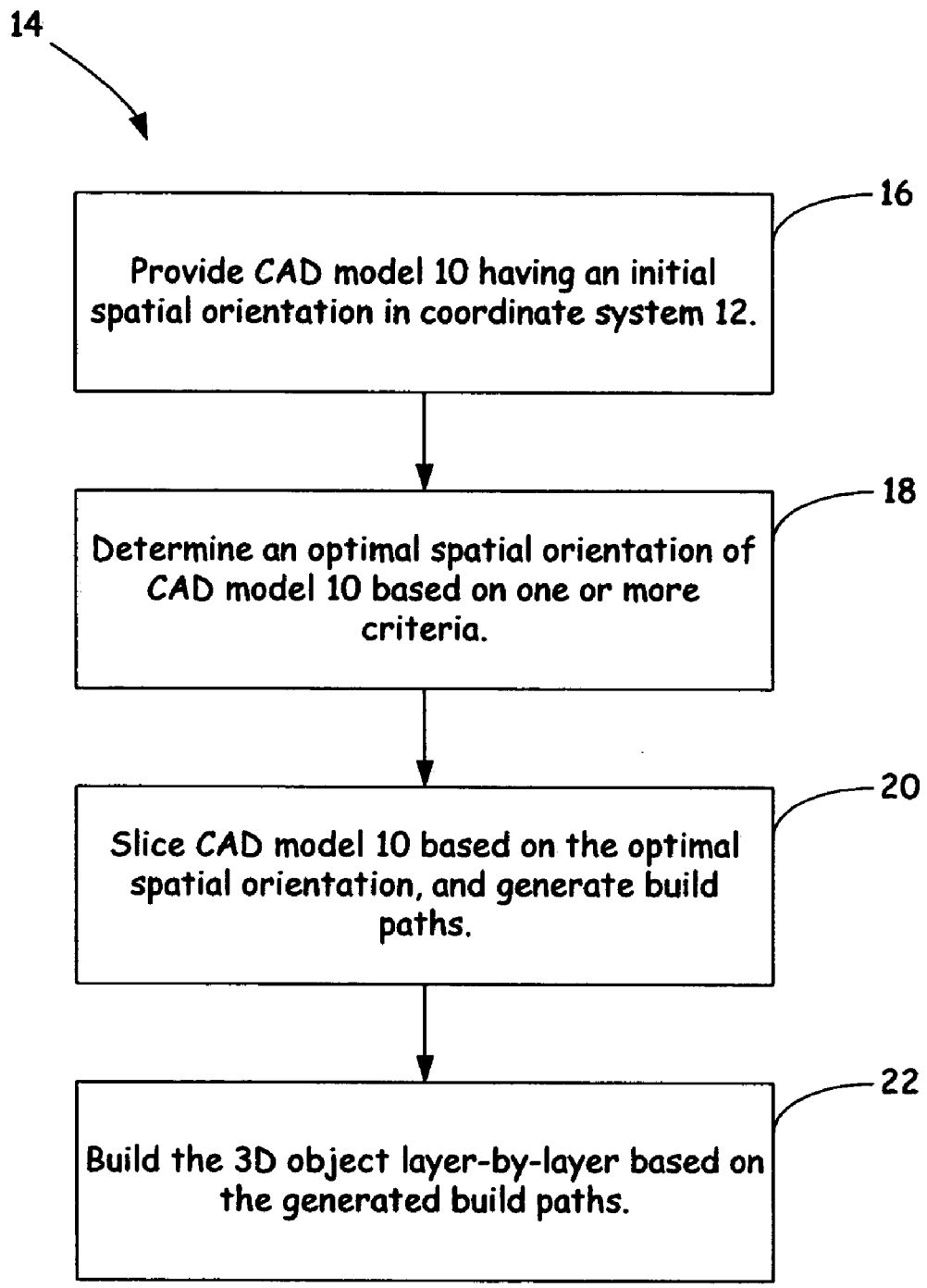
FIG. 2 is a block diagram of a method of the present invention for building a 3D object based on the CAD model.

FIG. 2 is a block diagram of method 14 of the present invention, which is a computer-implemented method for building a 3D object based on a CAD model. The following discussion of method 14 is made with reference to CAD model 10 shown in FIG. 1 with the understanding that method 14 is applicable to a variety of CAD models. Method 14 includes steps 16-22, and initially involves providing CAD model 10 to the computer, where CAD model 10 has an initial spatial orientation in coordinate system 12 (step 16). For the following discussion, the spatial orientation of CAD model 10 shown in FIG. 1 is assumed to be an initial spatial orientation.

Pursuant to method 14, the computer then determines an "optimal spatial orientation" of CAD model 10 in coordinate system 12 based on one or more criteria (step 18). The criteria are factors for optimizing build performance during the rapid manufacturing. Examples of suitable criteria include any type of rapid manufacturing build property, such as reducing the build time, minimizing the required volume of support material (referred to herein as "Volume$_{rsm}$"), improving the surface finish of the 3D object, increasing part strength of the 3D object, reducing footprint size (in the horizontal x-y plane), reducing the height of the 3D object (along axis 12z), improving fill patterns, obtaining user-specified orientations, improving material selections, and combinations thereof.

Based on the criteria that are selected, CAD model 10 may be rotated relative to one or more of axes 12x, 12y, and 12z to reach the final spatial orientation in coordinate system 12. For example, CAD model 10 may be repositioned to an optimal spatial orientation that minimizes the Volume$_{rsm}$, thereby reducing the amount of support material required to build the 3D object. Once CAD model 10 is disposed in the optimal spatial orientation based upon the criteria, the computer then slices CAD model 10 into layers (in the horizontal x-y plane) with a slicing algorithm (step 20). Build paths are then generated for the sliced layers and for any required support structures.

When the data generation is complete, a rapid manufacturing system then builds a 3D object based on the generated build paths (step 22). The 3D object is built with a physical spatial orientation that corresponds to the optimal spatial orientation of CAD model 10 in coordinate system 12. As a result, build performance during the rapid manufacturing is improved based on the one or more criteria that are selected.

Figure 3A:
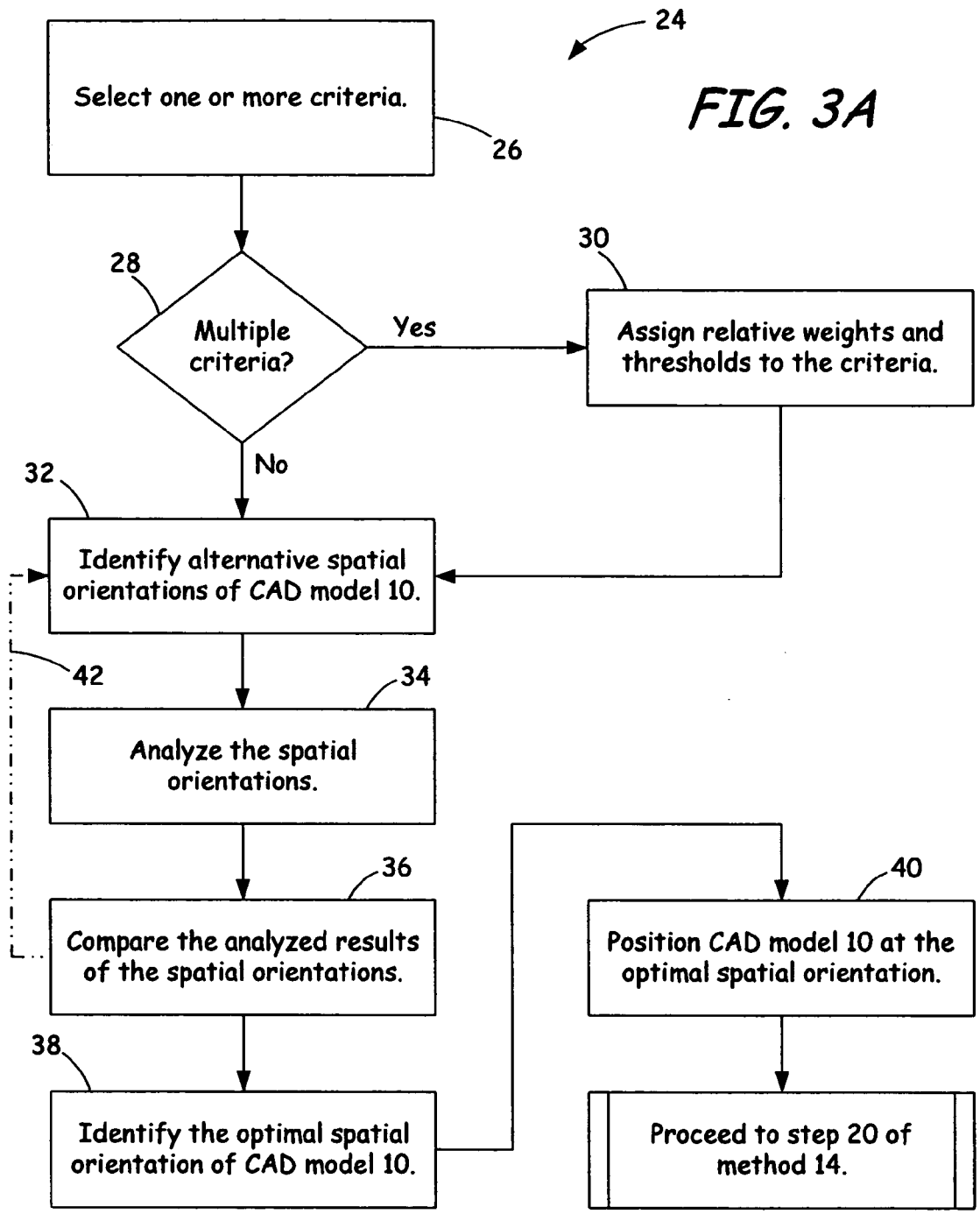
FIG. 3A is a block diagram of a method for determining an optimal spatial orientation of the CAD model pursuant to the method of the present invention.

FIG. 3A is a block diagram of method 24, which is an example of a suitable method for determining an optimal spatial orientation of CAD model 10 pursuant to step 18 of method 14 (shown above in FIG. 2). Method 24 includes steps 26-40, and initially involves selecting the one or more criteria (step 26). The one or more criteria may be manually selected from a list of factors, or may be preset in the computer. This latter "preset" embodiment is particularly suitable for automated processes, in which CAD model 10 is provided to a computer, and the computer then performs method 24 automatically or upon execution of a software routine (e.g., a user clicking on an execution button).

The computer then determines whether multiple criteria are selected (step 28). If so, relative weights and thresholds may be assigned to one or more of the selected criteria (step 30). As discussed below, the assigned relative weights and thresholds designate which criteria control during conflicting or unreasonable results. As with the criteria, the relative weights and thresholds may also be assigned manually or be preset in the computer as default values for automated processes. In one embodiment, the relative weights are assigned using a pairwise comparison, in which an individual relative weight is assigned between each pair of criteria, and overall relative weights are then generated based on the individual relative weights.

After the criteria are set, the computer then rotates CAD model 10 relative to one or more of axes 12x, 12y, and 12z to identify alternative spatial orientations of CAD model 10 in coordinate system 12 (step 32). The computer then analyzes the initial and alternative spatial orientations of CAD model 10 based on the one or more selected criteria, including any relative weights and thresholds assigned (step 34). As discussed below, the analysis performed generally depends on the criteria selected. For example, when selecting a criterion of minimizing the Volume$_{rsm}$, the computer calculates the Volume$_{rsm}$ for each of the initial and alternative spatial orientations to determine which spatial orientation requires the lowest volume of support material.

During the analysis, the computer incorporates the assigned relative weights and thresholds into the analyzed results. The relative weights provide weighted average results when two or more criteria have conflicting results for a particular spatial orientation. Because the raw results of the criteria are typically quantified in different units, a weighted average of the raw results may not necessarily be meaningful. To account for this, the computer may normalize each of the results of the criteria to a uniform ranking (e.g., a scale of 0-100). The computer may then provide a weighted averaged result based on the normalized results of the criteria and the assigned relative weights.

The assigned thresholds provide override values that prevent unreasonable final spatial orientations from being used. For example, if a criteria of minimizing the build time is selected, a threshold value may be assigned that designates the longest build time that is acceptable. Any spatial orientations of CAD model 10 that result in build times greater than the threshold value are automatically rejected, regardless of the results of any other criteria selected.

The use of relative weights and thresholds increases the likelihood of obtaining analyzed results that are reliable for improving build performance based on the one or more selected criteria. As discussed above, the relative weights and thresholds may be assigned manually or may be preset. In alternative embodiments, step 30 may be omitted if the relative weights and/or the thresholds are not required for a given analysis.

After the analysis in step 34, the analyzed results of the initial and alternative spatial orientations are then compared to establish which spatial orientation of CAD model 10 provides the optimal results based on the one or more criteria (step 36). The computer may perform the comparison in a variety of manners, such as by ranking the initial and alternative spatial orientations by the analyzed results. The computer then identifies the spatial orientation that provides the optimal results (step 38).

The spatial orientation that provides the optimal results for the spatial orientations analyzed, based on the one or more selected criteria, is referred to herein as the "optimal spatial orientation". For example, if the analysis in step 34 is based on a criterion of minimizing the Volume$_{rsm}$, the optimal spatial orientation is the spatial orientation of CAD model 10 that requires the lowest volume of support material.

Once the optimal spatial orientation is identified, the computer then positions CAD model 10 at the optimal spatial orientation (step 40). The computer then slices CAD model 10 into horizontal layers and generates build paths, as discussed above in step 20 of method 14 (shown above in FIG. 2).

In an alternative embodiment, steps 32-36 may be performed in an iterative manner (as designated by phantom arrow 42). In this embodiment, a given alternative spatial orientation that is identified in step 32 is analyzed and compared in steps 34 and 36 prior to the identification of a subsequent alternative spatial orientation in step 32. The computer then repeats steps 32-36 for each alternative spatial orientation identified. During each comparison in step 36, the computer updates the "optimal spatial orientation" of CAD model 10, thereby reducing computer storage requirements (i.e., data of non-optimal spatial orientations are discarded).

Figure 3B:
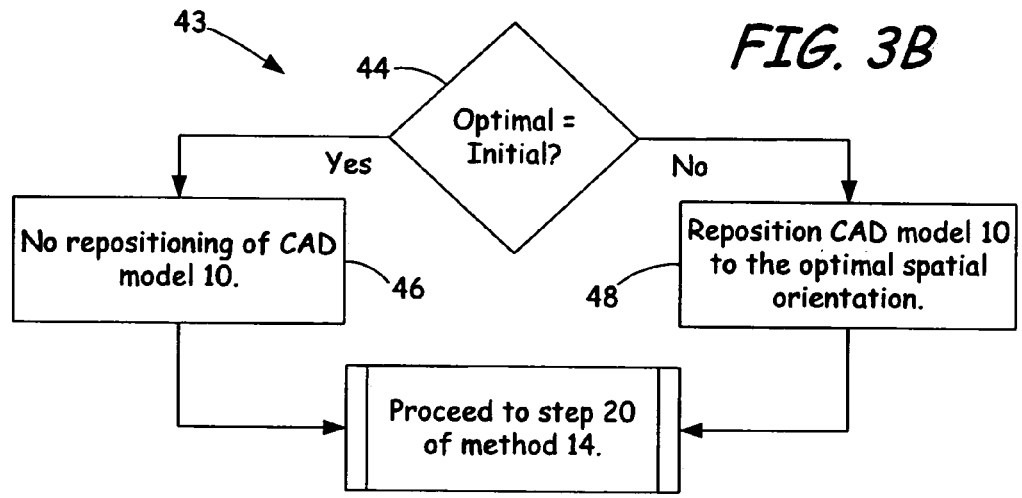
FIG. 3B is a block diagram of a method for positioning the CAD model at the optimal spatial orientation.

FIG. 3B is a block diagram of method 43 for positioning CAD model 10 at the optimal spatial orientation, pursuant to step 40 of method 24 (shown above in FIG. 3A). As shown in FIG. 3B, method 43 includes steps 44-48, and initially involves determining whether the optimal spatial orientation is the same as the initial spatial orientation (step 44). If so, then CAD model 10 is not repositioned because the initial spatial orientation is the "optimal" spatial orientation for CAD model 10, and no change in position is required (step 46).

Alternatively, if the optimal spatial orientation is not the same as the initial spatial orientation, the computer repositions CAD model 10 to the optimal spatial orientation in coordinate system 12 (step 48). This allows the resulting 3D object to be built with the optimal spatial orientation rather than the initial spatial orientation. After either step 46 or 48 is performed, CAD model 10 is then sliced into horizontal layers and generates build paths, as discussed above in step 20 of method 14 (shown above in FIG. 2).

Figure 4:
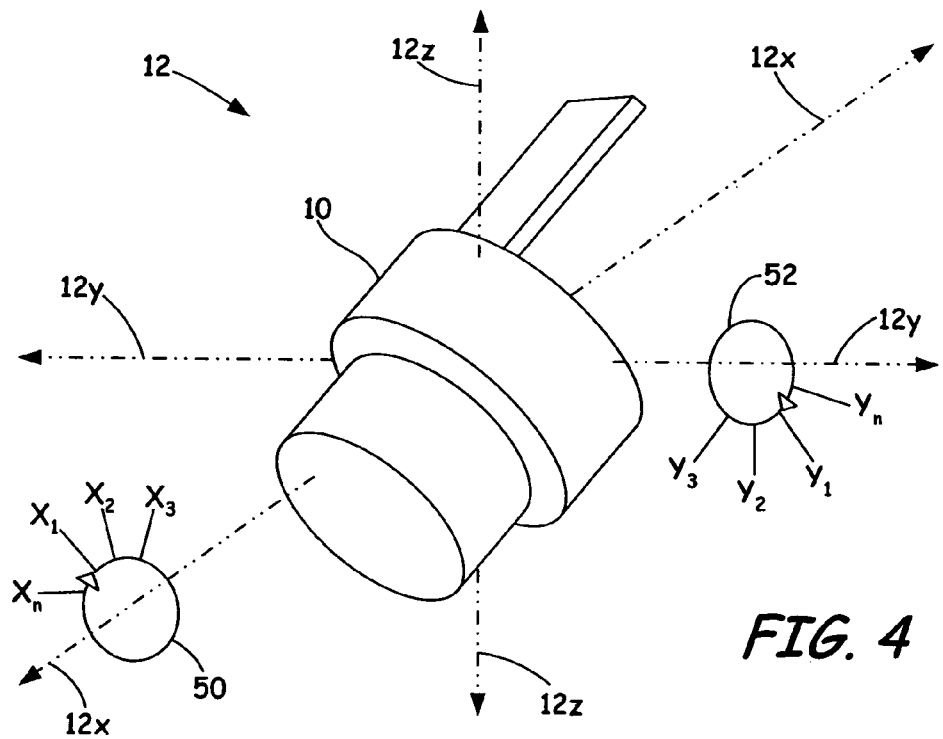
FIG. 4 is a perspective view of the 3D model having an initial spatial orientation in the Cartesian coordinate system.
Figure 5:
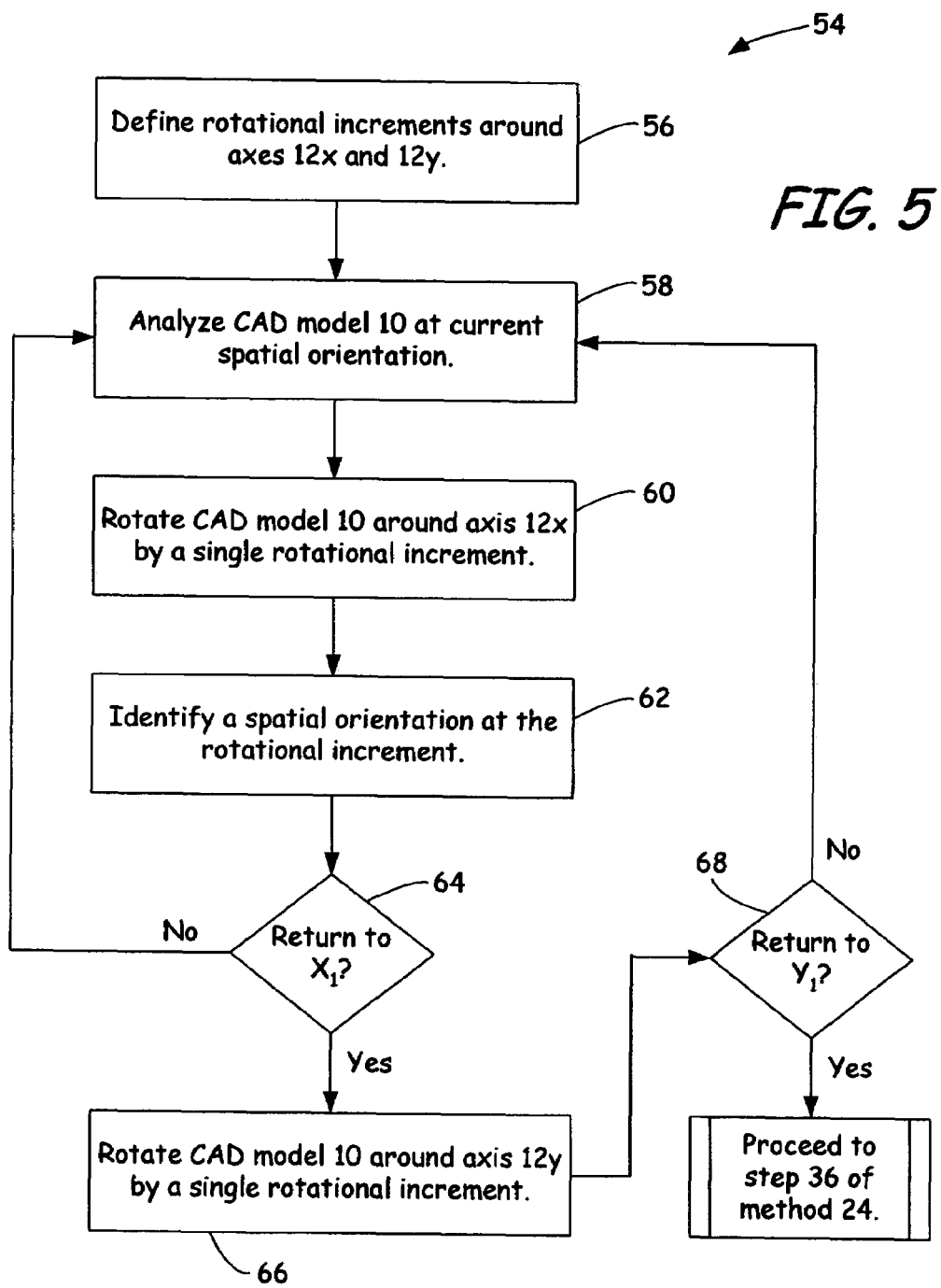
FIG. 5 is a block diagram of a suitable method for identifying and analyzing spatial orientations of the CAD model shown in FIG. 4.

FIGS. 4 and 5 show a first suitable method for identifying and analyzing spatial orientations of CAD model 10, pursuant to steps 32 and 34 of method 24 (shown above in FIG. 3A). FIG. 4 is a perspective view of CAD model 10 having an initial spatial orientation in coordinate system 12, and is provided to illustrate the method discussed below in FIG. 5. As a general overview of the method, the computer identifies alternative spatial orientations of CAD model 10 by rotating CAD model 10 around axis 12x (as represented by arrow 50), around axis 12y (as represented by arrow 52), and around vector combinations of axes 12x and 12y (not shown). At each alternative spatial orientation, the computer analyzes the given spatial orientation based on the one or more criteria selected. The computer then compares the analyzed results of the alternative spatial orientations, as discussed above in step 36 of method 24 (shown above in FIG. 3A).

It is noted that rapid manufacturing systems typically build 3D objects layer-by-layer along axis 12z. As a result, rotation around axis 12z is generally unnecessary because such rotations generally provide the same analyzed results for the criteria (e.g., same Volume$_{rsm}$ for all spatial orientations rotated around axis 12z). Nonetheless, CAD model 10 may also be rotated around axis 12z as necessary for analyzing the criteria.

Rotational increments around axis 12x are represented in FIG. 4 as increments $X_1, X_2, X_3, \ldots, X_n$, where $X_1$ represents the initial spatial orientation of CAD model 10 relative to axis 12x. Similarly, rotational increments around axis 12y are represented as increments $Y_1, Y_2, Y_3, \ldots, Y_m$, where $Y_1$ represents the initial spatial orientation of CAD model 10 relative to axis 12y. Thus, the initial spatial orientation of CAD model 10 positions CAD model 10 at increments $X_1$ and $Y_1$.

FIG. 5 is a block diagram of method 54 for identifying and analyzing spatial orientations of CAD model 10, which includes steps 56-68. Steps 56-60 and 64-68 generally correspond to step 32 of method 24 (shown above in FIG. 3A), and step 62 generally corresponds to step 34 of method 24. As shown in FIG. 5, method 54 initially involves defining rotational increments $X_1$-$X_n$ around axis 12x and rotational increments $Y_1$-$Y_m$ around axis 12y (step 56). The rotational increments are desirably evenly spaced to provide an even distribution of measurements.

The computer then analyzes CAD model 10 at the current spatial orientation (i.e., position $X_1, Y_1$) based on each criterion selected (step 58). For example, if the selected criteria include (1) minimizing the Volume$_{rsm}$ and (2) minimizing the footprint of the 3D object, then for the given spatial orientation, the computer calculates (1) the volume of support material required to build a 3D object having the given spatial orientation, and (2) the horizontal footprint of CAD model 10. Suitable techniques for calculating the Volume$_{rsm}$ and the horizontal footprint are discussed below. Additionally, because two criteria are selected, the computer may also incorporate any assigned relative weights and thresholds to provide a weighted result for the given spatial orientation.

Once the analyzed results are calculated for the current spatial orientation, the computer then rotates CAD model 10 around axis 12x by a single rotational increment (i.e., from position $X_1$ to position $X_2$) (step 60). The spatial orientation of CAD model 10 at increment $(X_2, Y_1)$ is then identified (step 62).

The computer then determines whether the current rotational increment is position $X_1$ to assess whether CAD model 10 has completely rotated around axis 12x (step 64). In this example, CAD model 10 is currently only at position $X_2$. Therefore, steps 58-64 are repeated until CAD model 10 is completely rotated around axis 12x, and returns to position $X_1$. This provides analyzed results for "n" spatial orientations around axis 12x.

Once CAD model 10 is completely rotated around axis 12x, the computer then rotates CAD model 10 around axis 12y by a single increment (i.e., from position $Y_1$ to position $Y_2$) (step 66). The computer then determines whether the current rotational increment is position $Y_1$ to assess whether CAD model 10 has completely rotated around axis 12y (step 68). In this example, CAD model 10 is currently only at position $Y_2$. Therefore, steps 58-68 are repeated until CAD model 10 is completely rotated around axis 12y, and returns to position $Y_1$.

Once CAD model 10 returns to position $Y_1$, the computer will have calculated build properties for up to "n" spatial orientations around axis 12x for each of "m" incremental rotations around axis 12y. This provides analyzed results for up to "n*m" spatial orientations of CAD model 10, which are evenly spaced within coordinate system 12. The actual number of analyzed results may be less than this product because the computer may ignore duplicate special orientations to further reduce computational time.

Once the spatial orientations of all of the rotational increments are analyzed, the analyzed results for the initial and alternative spatial orientations are then compared in step 36 of method 24 (shown above in FIG. 3A) to determine which spatial orientation provides the optimal results. For example, when minimizing the Volume$_{rsm}$, the computer compares the Volumes$_{rsm}$ of the initial and alternative spatial orientations to determine which spatial orientation provides the lowest Volume$_{rsm}$. The computer then identifies the optimal spatial orientation as the spatial orientation having the optimal results, pursuant to step 38 of method 24 (shown above in FIG. 3A). The resulting 3D object is then built pursuant to the optimal spatial orientation of CAD model 10, thereby improving build performance during the rapid manufacturing.

While method 54 is discussed above as having CAD model 10 rotated around axes 12x and 12y in a particular sequence, a variety of alternative rotational techniques may be used to arrive at the alternative spatial orientations. For example, the sequence in which CAD model 10 is rotated may differ from the sequence provided by method 54 (e.g., rotate around axis 12y for each rotational increment around axis 12x). Alternatively, the computer may have a pre-generated list of rotational coordinates that designate where CAD model 10 rotates to.

FIGS. 6A-15 describe a second suitable method for identifying and analyzing spatial orientations of CAD model 10, pursuant to steps 32 and 34 of method 24 (shown above in FIG. 3A). As a general overview, the method shown in FIGS. 6A-6C and 7 involves positioning CAD model 10 at "axially-aligned orientations", and identifying and analyzing a "stable orientation" of CAD model 10 for each axially-aligned orientation; FIGS. 8A-8C and 9 describe a suitable method for identifying and analyzing a stable orientation of CAD model 10; FIGS. 10A-10D and 11 describe a suitable method for determining whether a given spatial orientation is a stable orientation; FIGS. 12A-12D and 13 describe a suitable method for calculating a pivot axis; and FIGS. 14A, 14B, and 15 describe a suitable method for rotating CAD model 10 around the pivot axis.

Figure 6A:
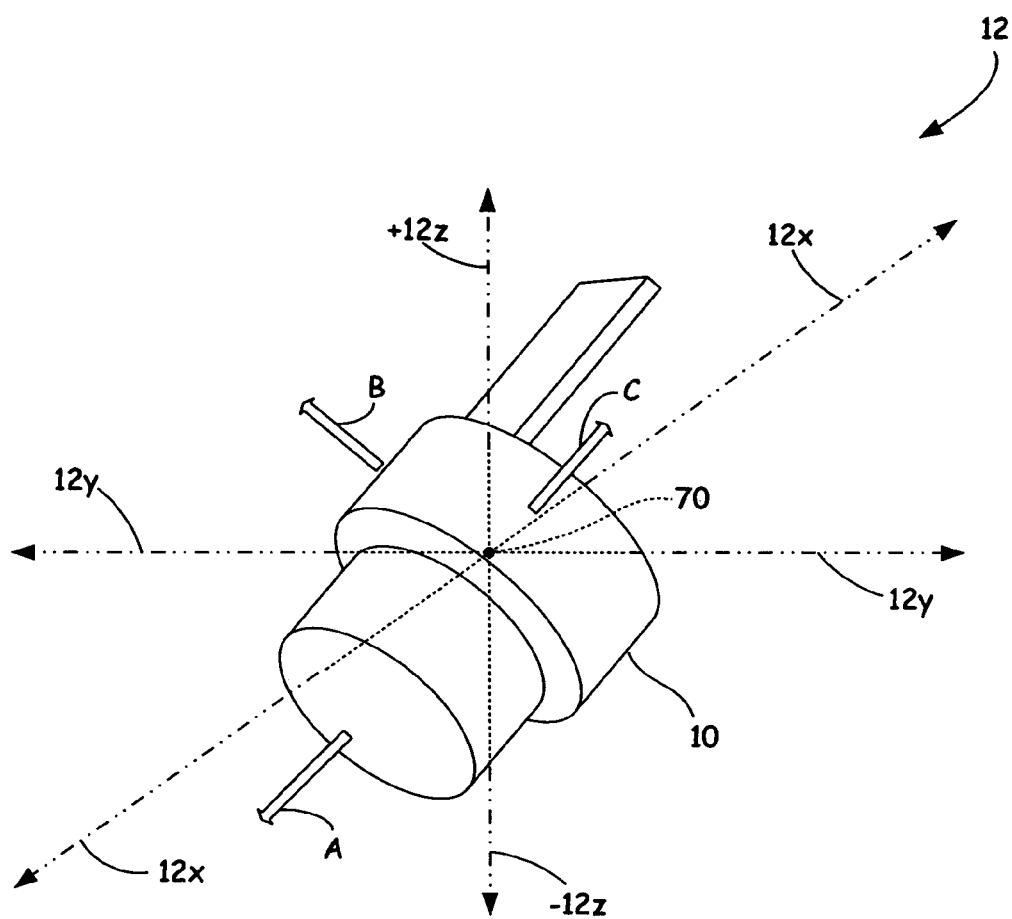
FIG. 6A is a perspective view of the CAD model having an initial spatial orientation in the Cartesian coordinate system.
Figure 6B:
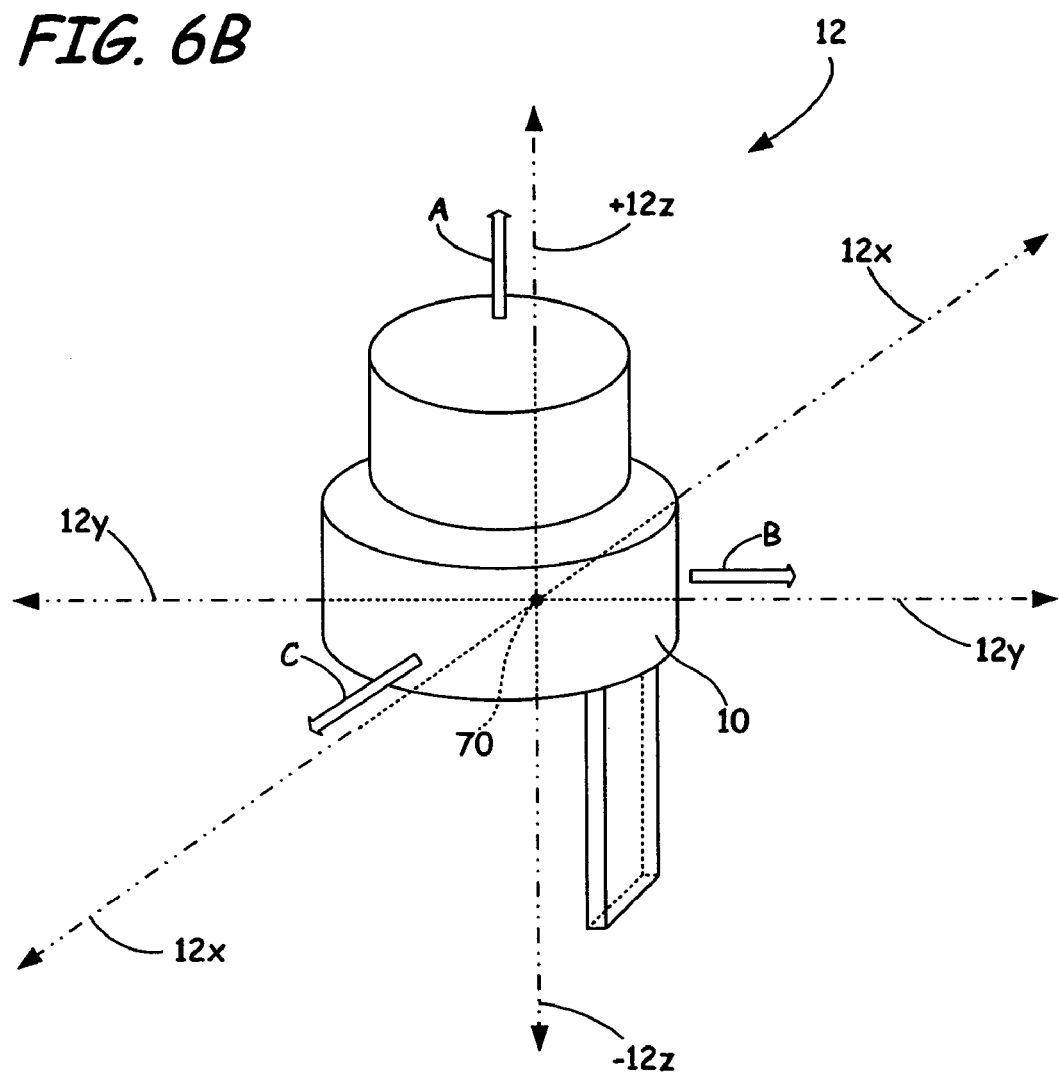
FIG. 6B is a perspective view of the CAD model having an axially-aligned orientation in the Cartesian coordinate system.
Figure 6C:
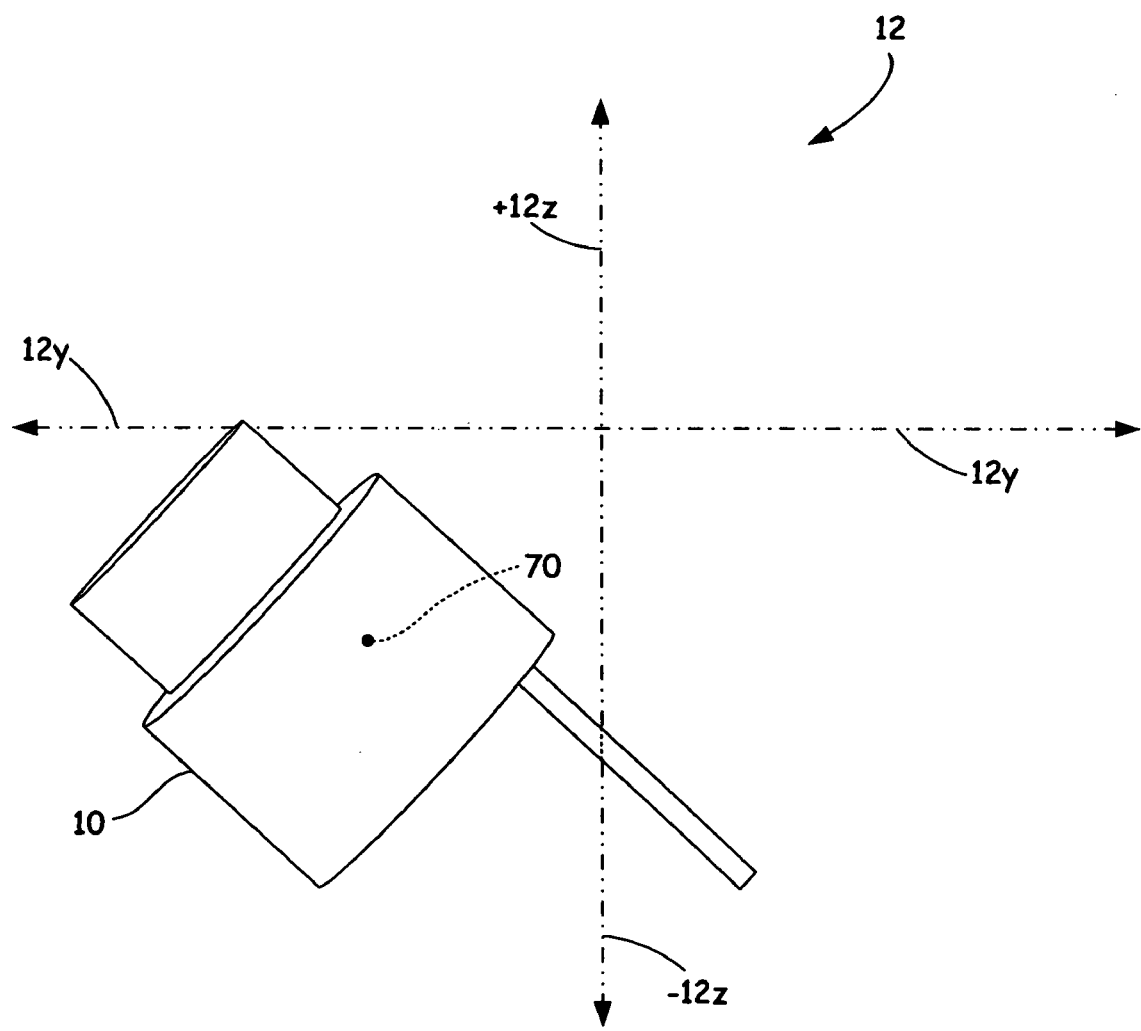
FIG. 6C is a side perspective view of the CAD model having a stable orientation in the Cartesian coordinate system after being rotated from the axially-aligned orientation shown in FIG. 6B.

FIGS. 6A and 6B are perspective views (and FIG. 6C is a side view) of CAD model 10 having different spatial orientations in coordinate system 12, and are provided to illustrate the method discussed below in FIG. 7. FIG. 6A shows CAD model 10 in an initial spatial orientation. The portions of axes 12x, 12y, and 12z that extend through CAD model 10 are shown with hidden lines, and axis 12z of coordinate system 12 is subdivided into positive vector +12z and negative vector −12z. As shown, CAD model 10 has center of mass 70 and primary axes A, B, and C.

As discussed in detail below, the computer aligns the primary axes of CAD model 10 with positive vector 12z and negative vector −12z. This provides six spatial orientations of CAD model 10 (three orientations facing positive directions and three orientations facing negative directions). FIG. 6B shows CAD model 10 positioned such that principal axis A is aligned with positive vector +12z. The computer then rotates CAD model 10 to stable orientations, if necessary, and analyzes CAD model 10 in the stable orientations based on the one or more criteria selected. Terms such as "stable", "stability", and the like, refer to the positional stability of an object (i.e., the resistance to falling over). FIG. 6C shows CAD model 10 having a stable orientation after being rotated from the spatial orientation shown in FIG. 6B.

Figure 7:
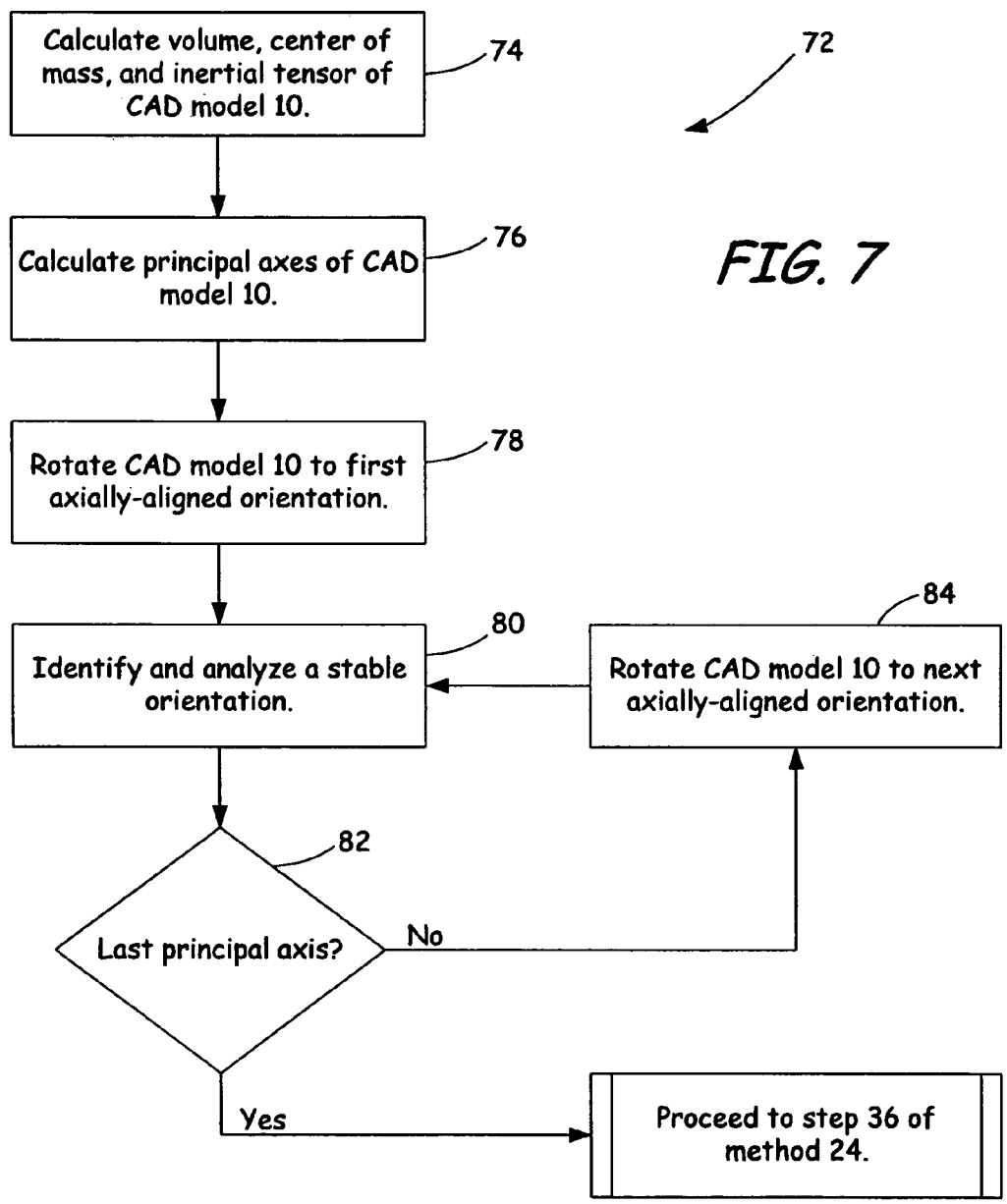
FIG. 7 is a block diagram of a suitable method for identifying and analyzing stable orientations of the CAD model shown in FIGS. 6A-6C.

FIG. 7 is a block diagram of method 72 for identifying and analyzing stable orientations of CAD model 10. Method 72 includes steps 74-84, and initially involves calculating the volume, center of mass 70, and the inertial tensor of CAD model 10 (step 74) while CAD model 10 is in the initial spatial orientation, as shown above in FIG. 6A. The volume of CAD model 10 is based on the corresponding geometric dimension, and center of mass 70 is a function of the volume and the density of the build material used (or a constant value may be used). The inertial tensor describes the amount of angular moment that CAD model 10 possesses, which allows the computer to calculate principal axes A, B, and C by diagonalizing the inertial tensor (step 76).

The computer then rotates CAD model 10, using center of mass 70 as a pivot point, to a first axially-aligned orientation in which principal axis A is aligned with positive vector +12z (step 78). This rotates CAD model 10 from the initial spatial orientation shown in FIG. 6A to the axially-aligned orientation shown in FIG. 6B.

The computer then identifies a stable orientation from the axially-aligned orientation, and analyzes CAD model 10 at the stable orientation based on the one or more criteria selected (step 80). A suitable method for performing step 80 is discussed below in FIGS. 8A, 8B, and 9. In the current example, the computer repositions CAD model 10 from the axially-aligned orientation shown above in FIG. 6B to the stable orientation shown above is FIG. 6C. The computer then analyzes CAD model 10 at the stable orientation based on the one or more criteria selected.

The computer then determines whether the last axially-aligned orientation (i.e., principal axis A aligned with positive vector +12z) is the last of the six axially-aligned orientations (step 82). At this point, there are five remaining axially-aligned orientations that are not yet analyzed. Therefore, the computer rotates CAD model 10 to the next axially-aligned orientation (e.g., principal axis B aligned with positive vector +12z) (step 84). The computer then identifies a stable orientation based on this next axially-aligned orientation, and analyzes CAD model 10 at the stable orientation, based on the one or more criteria selected (step 80).

The computer then repeats steps 80-84 until all six axially-aligned orientations are analyzed. This provides analyzed results for six stable orientations of CAD model 10. The computer then compares the analyzed results of the six stable orientations and identifies the "optimal spatial orientation" of CAD model 10 for the one or more criteria, as discussed above in steps 36 and 38 of method 24 (shown above in FIG. 3A). Accordingly, method 72 is beneficial for limiting the number of spatial orientations analyzed (i.e., six aligned spatial orientations), where the analyzed spatial orientations are stable orientations.

While discussed above with reference to principal axes A, B, and C, method 72 may alternatively be performed using additional or fewer principal axes than discussed above, which determines the number of spatial orientations that are analyzed. For example, sub-principal axes may be calculated from the principal axes and used in the same manner. This provides for a greater level of control over the number of computations involved.

Figure 8A:
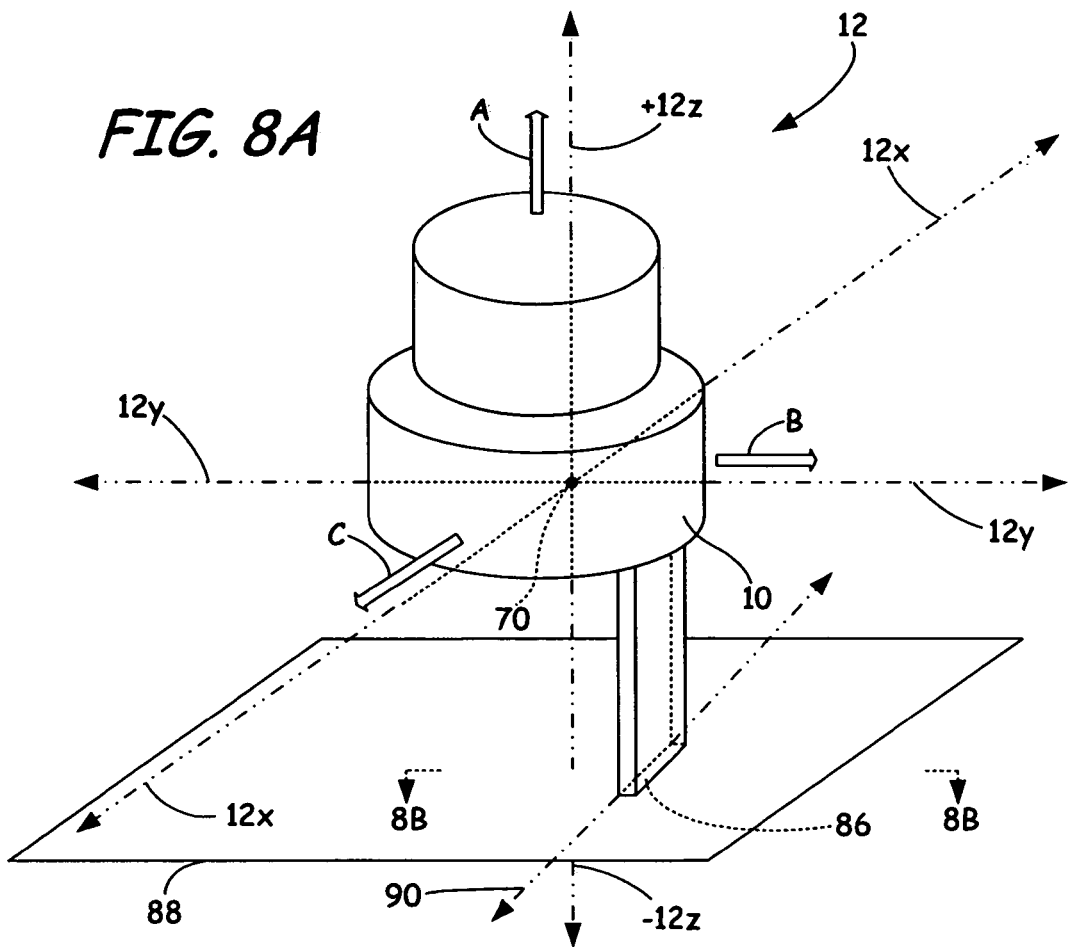
FIG. 8A is a perspective view of the CAD model having an axially-aligned orientation in the Cartesian coordinate system.
Figure 8B:
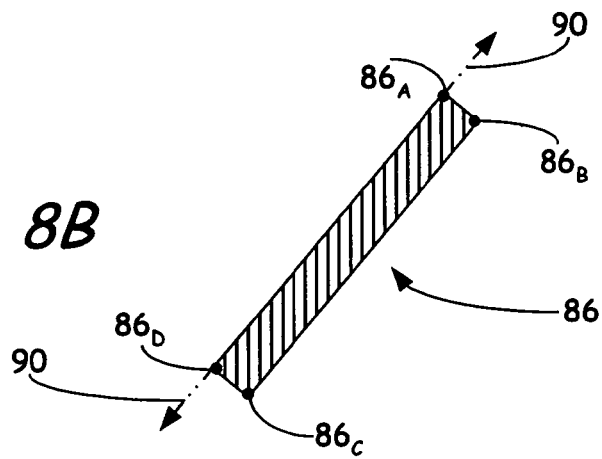
FIG. 8B is a sectional view of a bottom surface of the CAD model, taken from section 8B-8B in FIG. 8A.
Figure 8C:
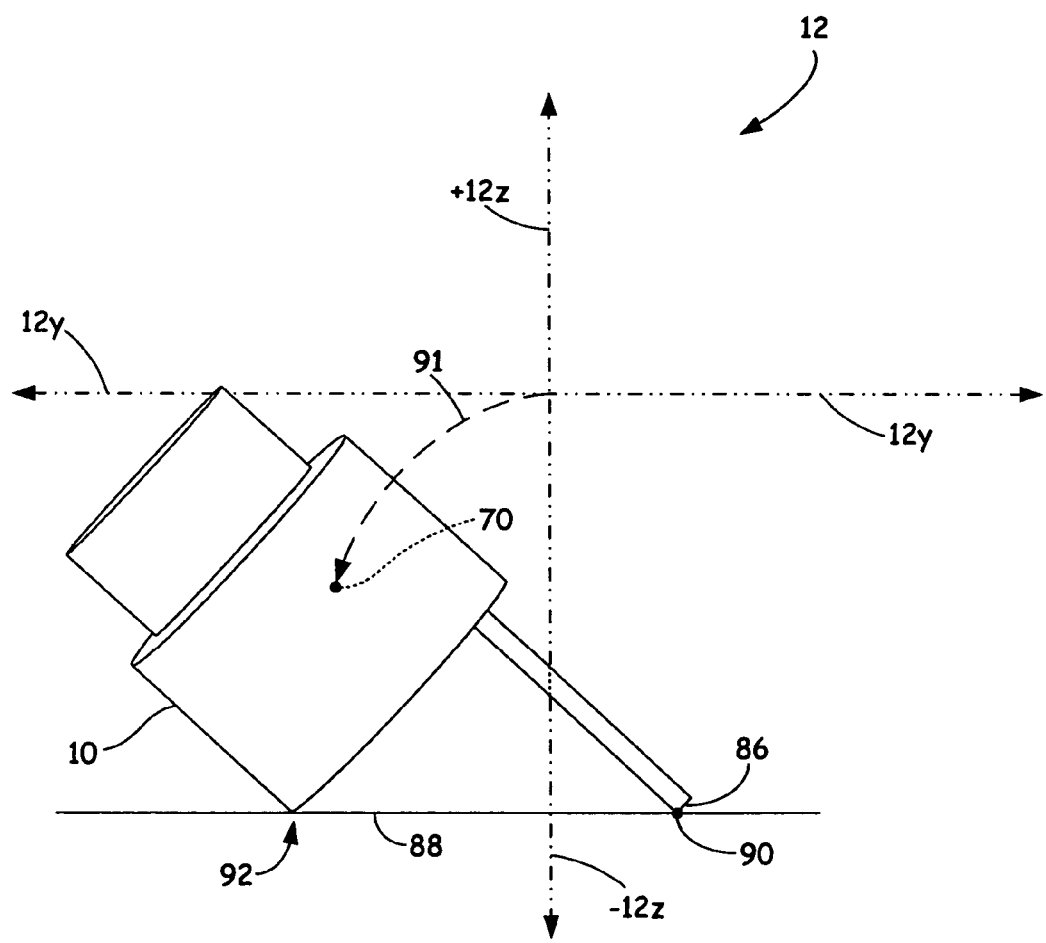
FIG. 8C is a side perspective view of the CAD model having a stable orientation in the Cartesian coordinate system after being rotated from the axially-aligned orientation shown in FIG. 8A.

FIGS. 8A-8C and 9 describe a suitable method for identifying and analyzing a stable orientation of CAD model 10, pursuant to step 80 of method 72 (shown above in FIG. 7). FIGS. 8A-8C are provided to illustrate the method discussed below in FIG. 9.

FIG. 8A is a perspective view of CAD model 10 in the axially-aligned orientation shown above in FIG. 6B. As shown in FIG. 8A, CAD model 10 further includes surface 86, which is the bottom surface of CAD model 10. The exterior surfaces of CAD models contain multiple vertices (i.e., data points) that designate the corners and curve locations of the CAD models. Each vertex contains an x-y-z coordinate location in coordinate system 12, and vector segments interconnect the vertices to define the exterior surface of the CAD model. Accordingly, surface 86 is a bottom surface of CAD model 10 that includes the "lowest" vertices of CAD model 10, vertically along axis $12z$.

Based in part on surface 86, the computer calculates horizontal plane 88 and pivot axis 90 to identify a stable orientation of CAD model 10. Horizontal plane 88 is a horizontal x-y plane that is vertically level with surface 86 along axis $12z$, and represents a platform for building a 3D object. Pivot axis 90 is an axis around which CAD model 10 rotates to arrive at a stable orientation.

FIG. 8B is a sectional view of surface 86 taken from section 8B-8B in FIG. 8A (horizontal plane 88 is omitted). FIG. 8B further illustrates the "lowest" vertices of CAD model 10, which are referred to as vertices $86_A$-$86_D$. As shown, vertices $86_A$-$86_D$ are located at the corners of surface 86, thereby defining a rectangular area that is parallel with a plane defined by axes $12x$ and $12y$.

FIG. 8C is a side view of CAD model 10 in the stable orientation shown above in FIG. 6C. As shown in FIG. 8C, the computer rotates CAD model 10 around pivot axis 90 (as shown by arrow 91) to arrive at the stable orientation, which occurs when vertex 92 of CAD model 10 reaches horizontal plane 88. Vertex 92 is a "non-lowest" data point of the exterior surface of CAD model 10.

Figure 9:
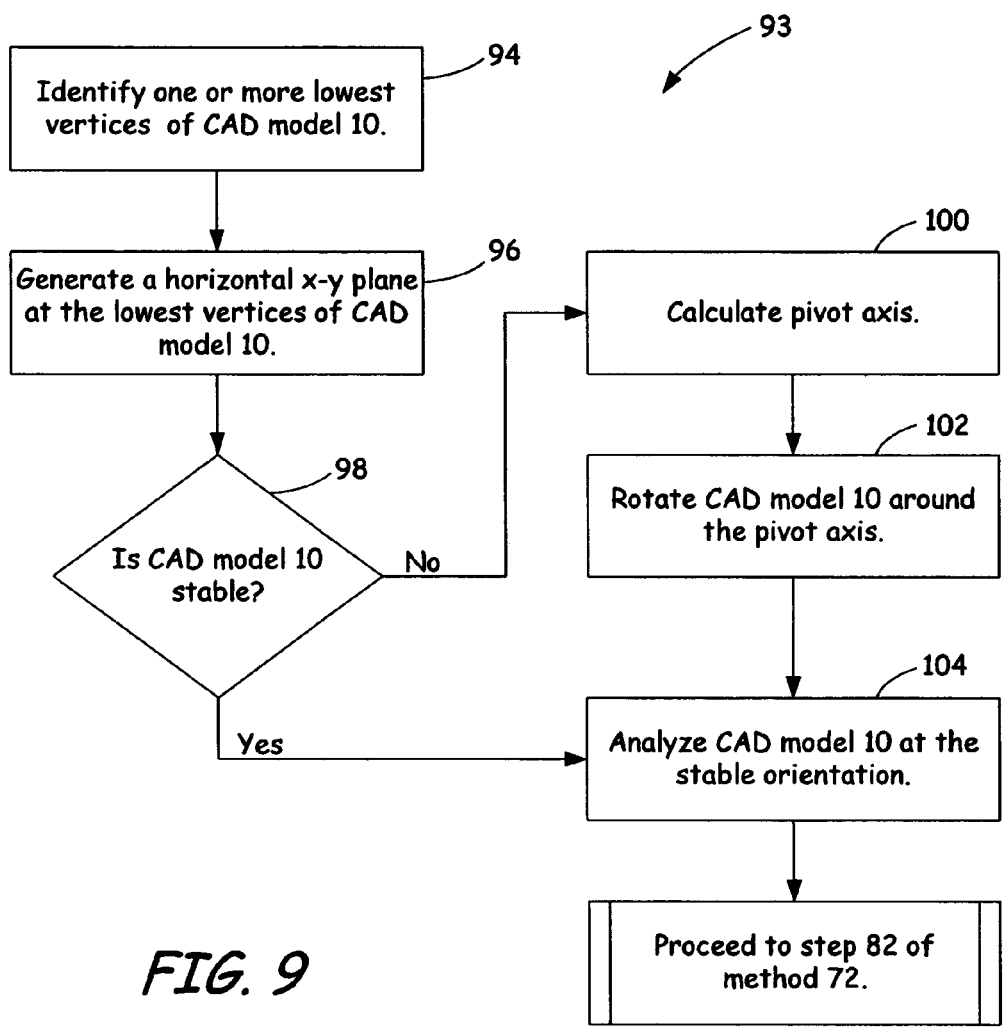
FIG. 9 is a block diagram of a method for identifying and analyzing a stable orientation of the CAD model shown in FIGS. 8A-8C.

FIG. 9 is a block diagram of method 93 for identifying and analyzing a stable orientation of CAD model 10, pursuant to step 80 of method 72. Method 93 includes steps 94-104, and initially involves identifying one or more "lowest" vertices of CAD model 10 (i.e., the one or more lowest data points of the exterior surface of CAD model 10), vertically along axis $12z$ (step 94). As discussed above, the lowest vertices of CAD model 10 are vertices $86_A$-$86_D$, which define surface 86. The computer then generates horizontal x-y plane 88 at a location that is vertically level with vertices $86_A$-$86_D$ of CAD model 10, along axis $12z$ (i.e., vertically level with surface 86) (step 96).

Next, the computer determines whether the axially-aligned orientation shown above in FIG. 8A is a stable orientation (step 98). A suitable method for determining stability pursuant to step 98 is discussed below in FIGS. 10 and 11, and generally involves determining the relative locations of center of mass 70 and the one or more lowest vertices of CAD model 10. If the axially-aligned orientation of CAD model 10 is a stable orientation, then the computer does not change the position of CAD model 10 because CAD model 10 is already in a stable orientation. However, if the axially-aligned orientation of CAD model 10 is not a stable orientation, then the computer calculates pivot axis 90 (step 100) and rotates center of mass 70 of CAD model 10 around pivot axis 90 (as represented by arrow 91) until data point 92 reaches horizontal plane 88 (step 102). This repositions CAD model 10 from the axially-aligned orientation shown above in FIG. 8A to the stable orientation shown above is FIG. 8C.

After either step 98 or 102 are performed to position CAD model 10 at a stable orientation, the computer then analyzes CAD model 10 based on the one or more criteria selected (step 104). The computer then determines whether the axially-aligned orientation shown above in FIG. 8A is the last of the six axially-aligned orientations, pursuant to step 82 of method 72 (shown above in FIG. 7). As discussed above, method 93 is beneficial for positioning CAD model 10 at a stable orientation before analyzing CAD model 10. This reduces the risk of building 3D objects in unstable orientations.

FIGS. 10A-10D and 11 describe a suitable method for determining whether a given spatial orientation is a stable orientation, pursuant to step 98 of method 93 (shown above in FIG. 9). FIGS. 10A-10D show examples of different CAD models (i.e., CAD models 10A-10D), and are provided to illustrate the method discussed below in FIG. 11.

FIG. 10A is a perspective view of CAD model $10_A$, which corresponds to CAD model 10 in the axially-aligned orientation shown above in FIG. 8A. As shown in FIG. 10A, the generated data also includes perimeter 106 and projection point 108. The term "perimeter" of a CAD model (e.g., perimeter 106) refers to a boundary on horizontal plane 88 that interconnects all of the lowest vertices of the CAD model. In this example, the lowest vertices of CAD model $10_A$ are vertices $86_A$-$86_D$. As such, perimeter 106 is a boundary that interconnects vertices $86_A$-$86_D$, thereby containing the same rectangular area as surface 86. Projection point 108 is a point on horizontal plane 88 that is vertically below center of mass 70, along axis $12z$. As shown in this example, projection point 108 is located outside of perimeter 106.

Figure 10B:
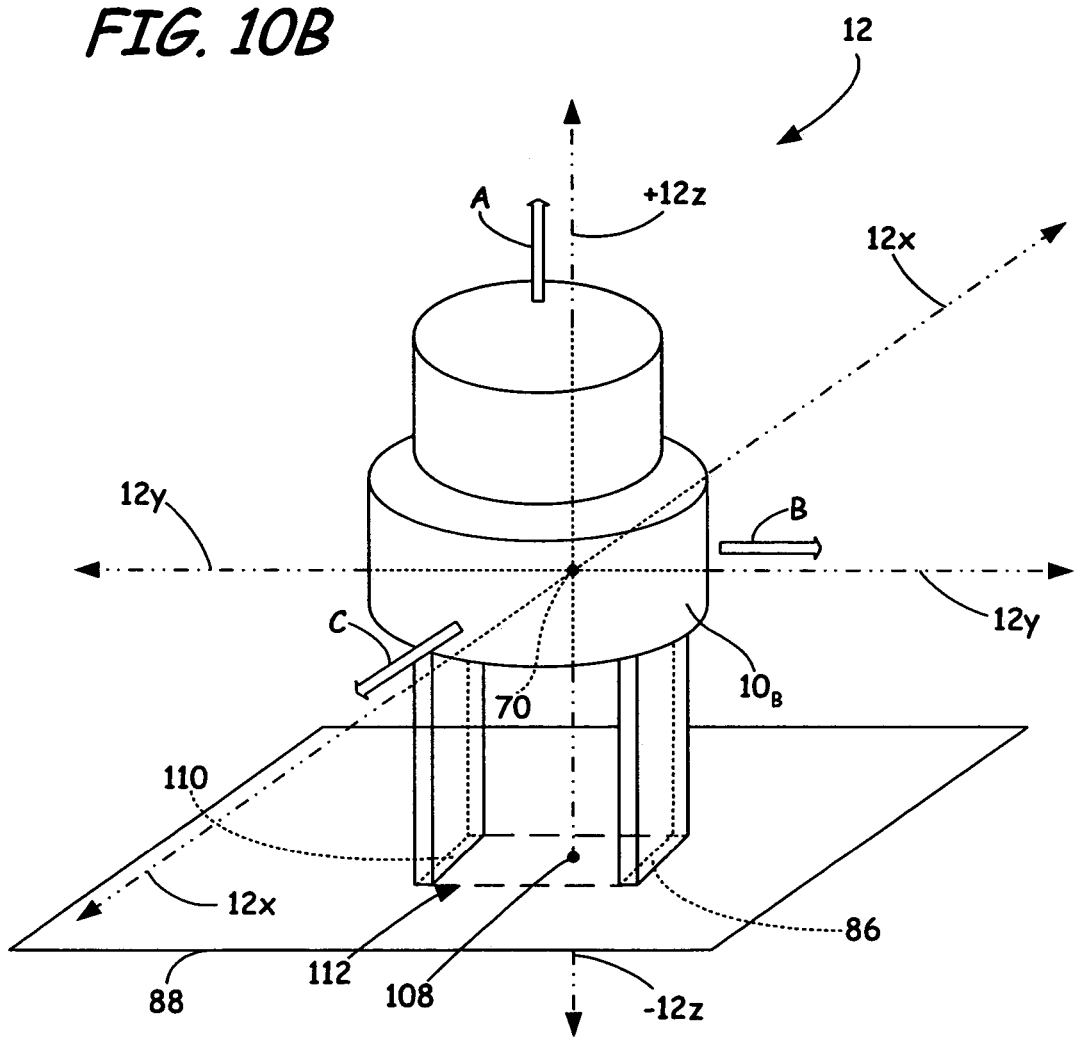
FIG. 10B is a perspective view of a first alternative CAD model having an axially-aligned orientation in the Cartesian coordinate system.

FIG. 10B is a perspective view of CAD model $10_B$, which is a first alternative example to CAD model $10_A$, and includes second surface 110. Second surface 110 is a second planar surface defined by vertices $110_A$-$110_D$ (not shown). Vertices $110_A$-$110_D$ are additional lowest vertices of CAD model $10_B$ that are level with vertices $86_A$-$86_D$, and define second surface 110. The generated data also includes perimeter 112 and projection point 108, where perimeter 112 is a boundary on horizontal plane 88 that is defined by all of the lowest vertices of CAD model $10_B$ (i.e., vertices $86_A$-$86_D$ and $110_A$-$110_D$). In this example, perimeter 112 contains an area that includes areas of surfaces 86 and 110, and the area between surfaces 86 and 110 (represented by dashed lines). Projection point 108 is the same as discussed above in FIG. $10_A$, and in this example, is located within perimeter 112.

FIG. 10C is a perspective view of CAD model $10_C$, which is a second alternative example to CAD model $10_A$, and includes edge 114 in lieu of surface 86. Edge 114 is defined by vertices $114_A$ and $114_B$ of CAD model $10_C$, which are the lowest vertices of CAD model $10_C$ (i.e., the lowest data points of the exterior surface of CAD model $10_C$). The generated data also includes projection point 108, which is the same as discussed above in FIG. 10A.

Figure 10D:
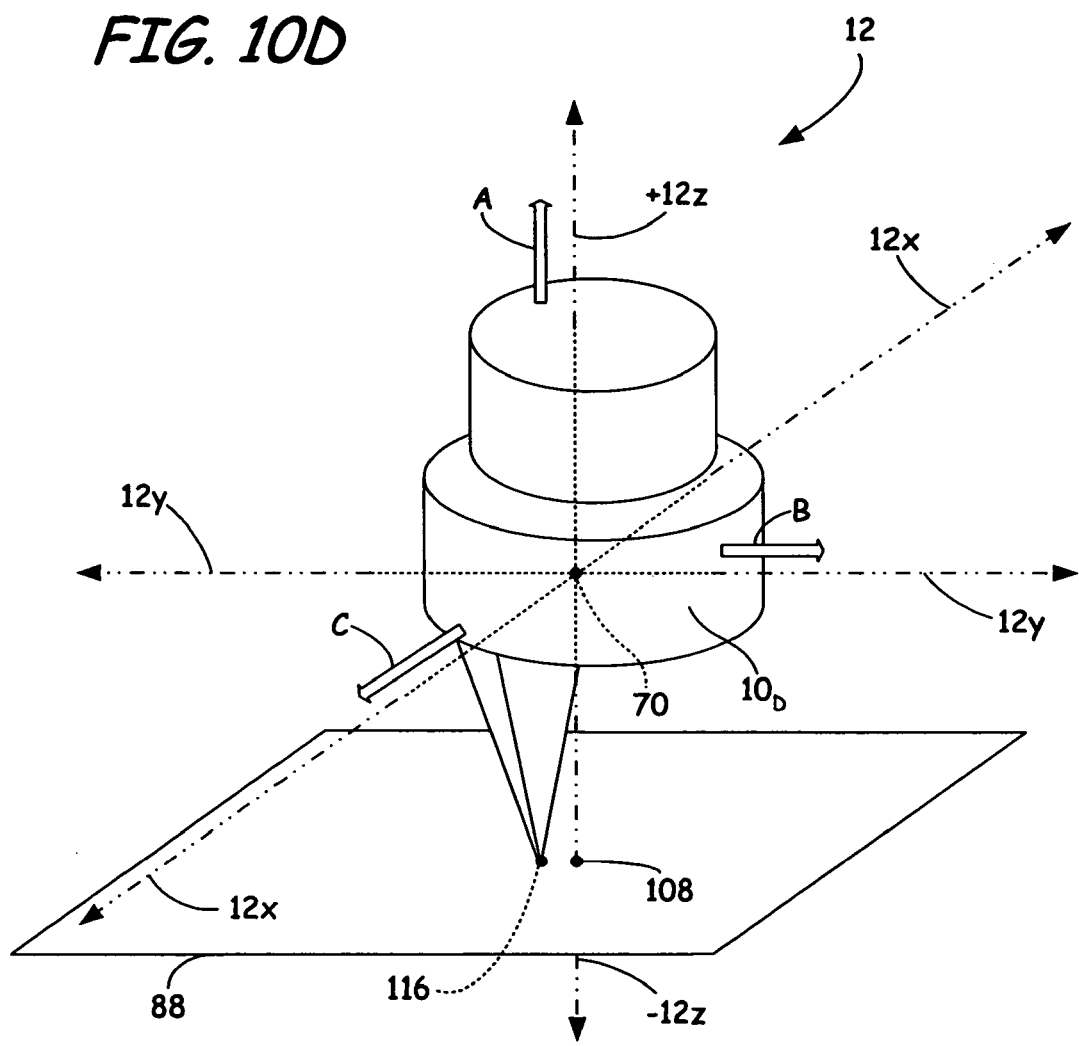
FIG. 10D is a perspective view of a third alternative CAD model having an axially-aligned orientation in the Cartesian coordinate system.

FIG. 10D is a perspective view of CAD model $10_D$, which is a third alternative example to CAD model $10_A$. CAD model $10_D$ includes tip 116 in lieu of surface 86, where tip 116 is located at a single lowest vertex of CAD model $10_D$ (i.e., the lowest data point of the exterior surface of CAD model $10_D$). The generated data also includes projection point 108, which is the same as discussed above in FIG. 10A.

Figure 11:
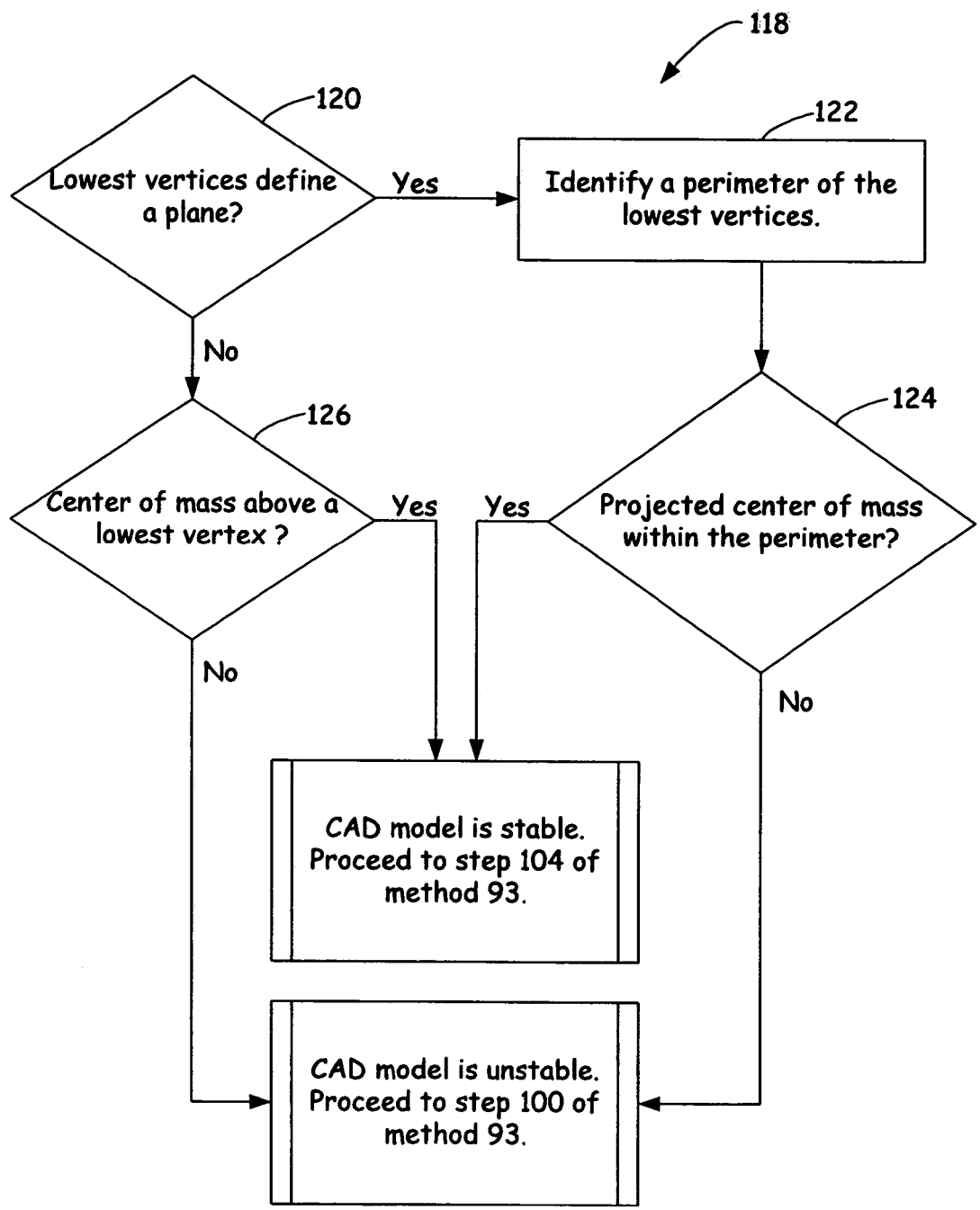
FIG. 11 is a block diagram of a method for determining if the spatial orientations of the CAD models shown in FIGS. 10A-10D are stable orientations.

FIG. 11 is a block diagram of method 118 for determining whether a given spatial orientation is a stable orientation, pursuant to step 98 of method 93. The following discussion of method 118 is initially made with reference to CAD model $10_A$ shown above in FIG. 10A.

Method 118 includes steps 120-124, and initially involves determining whether the lowest vertices of CAD model $10_A$ (i.e., vertices $86_A$-$86_D$) define a plane (step 120). This occurs when the lowest vertices include at least three lowest vertices that are non-colinear. In this example, vertices $86_A$-$86_D$ define a plane having at least three lowest vertices that are non-colinear (i.e., surface 86). Therefore, the computer proceeds to identify perimeter 106, which, as discussed above, is a boundary that includes vertices $86_A$-$86_D$ and contains the same rectangular area as surface 86 (step 122).

The computer then determines whether projection 108 of center of mass 70 is located within perimeter 106 (step 124). This determination generally relies on the concept that if the center of mass of a 3D object is balanced above the supporting surface of the 3D object, then the 3D object is in a stable orientation. In this example, however, projection 108 is disposed outside of perimeter 106. Therefore, the computer determines that the axially-aligned orientation shown in FIG. 10A is not a stable orientation. The computer then proceeds to step 100 of method 93 (shown above in FIG. 9) to calculate a pivot axis for rotating CAD model $10_A$ to a stable orientation.

Referring now to the example shown in FIG. 10B, the computer determines whether the lowest vertices of CAD model $10_B$ (i.e., vertices $86_A$-$86_D$ and $110_A$-$110_D$) define a plane (step 120). In this example, vertices $86_A$-$86_D$ and $110_A$-$110_D$ define a plane having at least three lowest vertices that are non-colinear (i.e., a plane that includes surfaces 86 and 110). Therefore, the computer proceeds to identify perimeter 112, which is based on vertices $86_A$-$86_D$ and $110_A$-$110_D$ (step 122). As discussed above, perimeter 112 has an area corresponding to the areas of surfaces 86 and 110, and the area between surfaces 86 and 110.

The computer then determines whether projection 108 of center of mass 70 is located within perimeter 112 (step 124). As shown above in FIG. 10B, projection 108 is located within perimeter 112 in this example. Therefore, the computer determines that the axially-aligned orientation shown in FIG. 10B is a stable orientation, and does not further rotate CAD model $10_B$. The computer proceeds to step 104 of method 93 (shown above in FIG. 9) to analyze CAD model $10_B$ in the axially-aligned orientation, based on the one or more criteria selected.

Referring now to the example shown in FIG. 10C, the computer determines whether the lowest vertices of CAD model $10_C$ define a plane (step 120). In this example, the lowest vertices of CAD model $10_C$ (i.e., vertices $114_A$ and $114_B$) only define a line, rather than a plane. Because a plane is not defined, a perimeter of the lowest vertices cannot be identified. Instead, the computer determines whether center of mass 70 is located directly above either of the lowest vertices (i.e., vertex $114_A$ or $114_B$) (step 126), vertically along axis $12z$.

If center of mass 70 is located directly above either vertex $114_A$ or vertex $114_B$, then the computer determines that the given axially-aligned orientation is a stable orientation, and does not rotate the CAD model. The computer then proceeds to step 104 of method 93 (shown above in FIG. 9) to analyze the CAD model in the given axially-aligned orientation, based on the one or more criteria selected.

As shown above in FIG. 10C, however, center of mass 70 is not located directly above either vertex $114_A$ or vertex $114_B$. Therefore, the computer determines that the axially-aligned orientation shown in FIG. 10C is not a stable orientation. The computer then proceeds to step 100 of method 93 (shown above in FIG. 9) to calculate a pivot axis for rotating CAD model $10_C$ to a stable orientation.

Referring now to the example shown in FIG. 10D, the computer determines whether the lowest vertex of CAD model $10_D$ defines a plane (step 120). In this example, CAD model $10_D$ has a single lowest vertex at tip 116, which does not define a plane. Therefore, the computer determines whether center of mass 70 is located directly above the lowest vertex of CAD model $10_D$ (i.e., directly above tip 116) (step 126). As shown in FIG. 10D, center of mass 70 is not located directly above tip 116. Therefore, the computer determines that the axially-aligned orientation shown in FIG. 10D is not a stable orientation. The computer then proceeds to step 100 of method 93 (shown above in FIG. 9) to calculate a pivot axis for rotating CAD model $10_D$ to a stable orientation.

It is noted that if tip 116 were located directly below center of mass 70 of CAD model $10_D$, the computer would determine that the given axially-aligned orientation is a stable orientation, despite the fact that the given orientation would not actually be stable. In situations such as this, the computer may adjust the location of center of mass 70 by a small value in a plane defined by axes $12x$ and $12y$. This small adjustment prevents center of mass 70 from being be located directly above tip 116, which causes the computer to identify the axially-aligned orientation as being an unstable orientation, pursuant to step 126.

FIGS. 12A-12D and 13 describe a suitable method for calculating a pivot axis (e.g., pivot axis 90), pursuant to step 100 of method 93 (shown above in FIG. 9). As discussed below, the pivot axis is used to determine the pivot point and direction in which the computer rotates a given CAD model. FIGS. 12A-12D show examples of different CAD models, and are provided to illustrate the method discussed below in FIG. 13.

Figure 12A:
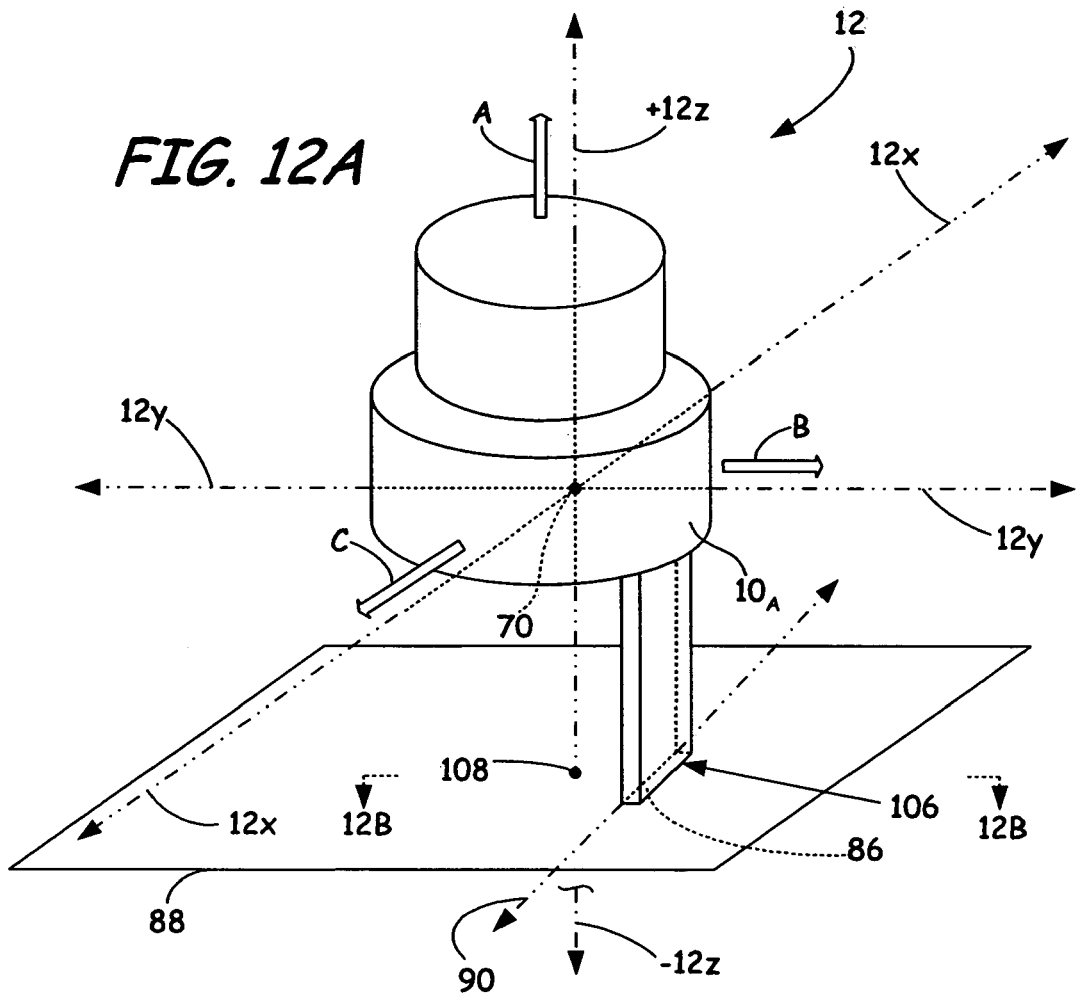
FIG. 12A is a perspective view of the CAD model having an axially-aligned orientation in the Cartesian coordinate system.

FIG. 12A is a perspective view of CAD model $10_A$ (shown above in FIG. 10A), which further includes pivot axis 90. Pivot axis 90 is the same as shown above in FIG. 8A, and is used for rotating CAD model $10_A$ from the axially-aligned orientation shown in FIG. 12A to a stable orientation.

Figure 12B:
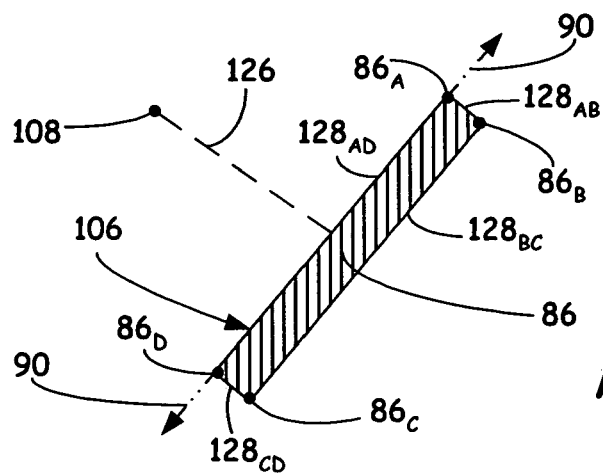
FIG. 12B is a sectional view of a bottom surface of the CAD model, taken from section 12B-12B in FIG. 12A.

FIG. 12B is a sectional view of surface 86 taken from section 12B-12B in FIG. 12A (horizontal plane 88 is omitted). FIG. 12B further shows line 126 and vertex segments $1128_{AB}$, $128_{BC}$, $128_{CD}$, and $128_{AD}$. Vertex segments $128_{AB}$, $128_{BC}$, $128_{CD}$, and $128_{AD}$ are vector segments that respectively interconnect vertices $86_A$-$86_D$ to define perimeter 106. Line 126 represents the shortest distance between perimeter 106 and projection 108 of center of mass 70, and intersects vector segment $128_{AD}$ at a midpoint location.

Figure 12C:
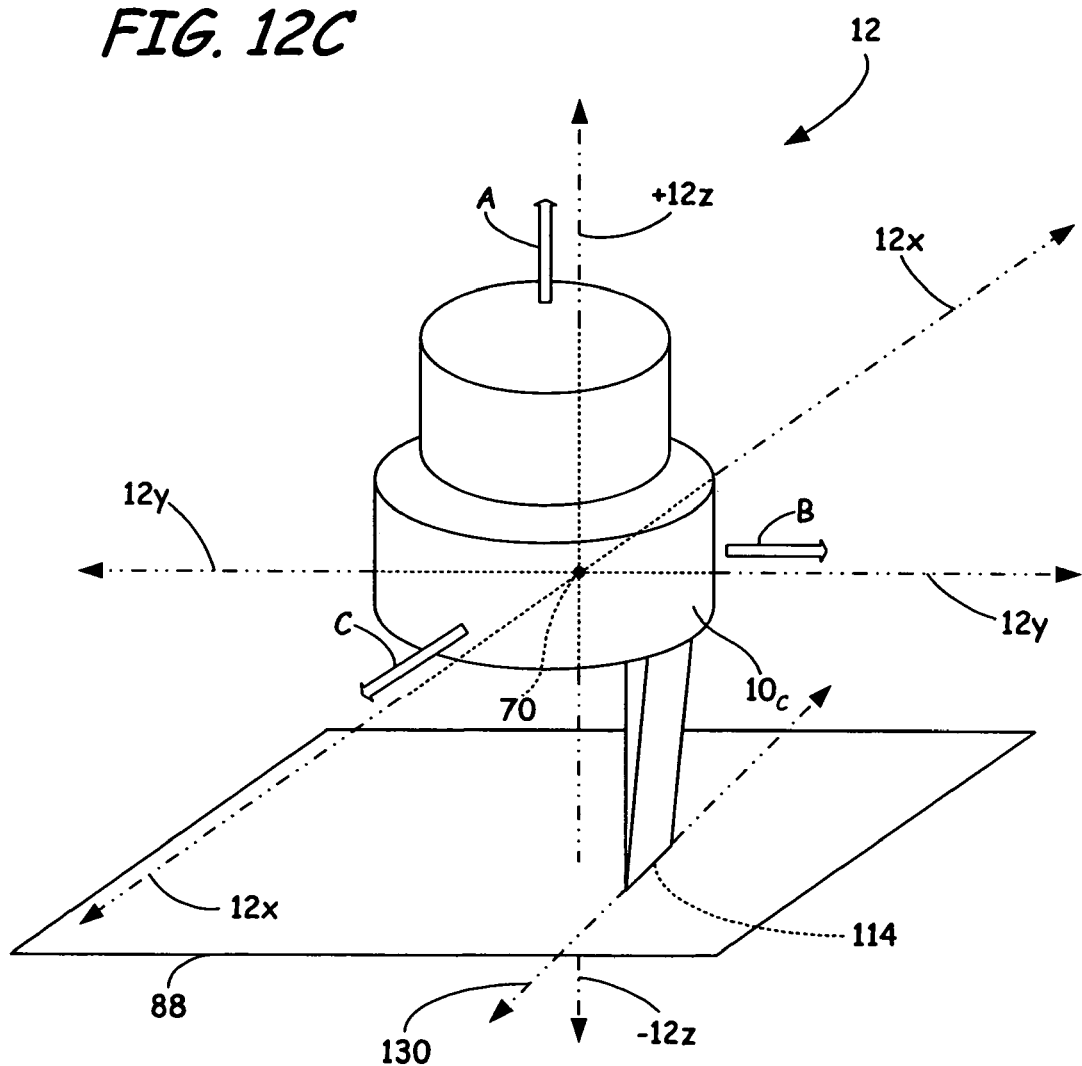
FIG. 12C is a perspective view of the second alternative CAD model having an axially-aligned orientation in the Cartesian coordinate system.

FIG. 12C is a perspective view of CAD model $10_C$, which further includes pivot axis 130. Pivot axis 130 functions in the same manner as pivot axis 90 (shown above in FIG. 8A) for rotating CAD model $10_C$ from the axially-aligned orientation shown in FIG. 12C to a stable orientation.

FIG. 12D is a perspective view of CAD model $10_D$, which further includes segment 132 and pivot axis 134, where segment 132 extends between center of mass 70 and tip 116. The portion of segment 132 that extends through CAD model $10_D$ is shown with a hidden line. Pivot axis 134 functions in the same manner as pivot axis 90 (shown above in FIG. 8A) for rotating CAD model $10_D$ from the axially-aligned orientation shown in FIG. 12D to a stable orientation.

Figure 13:
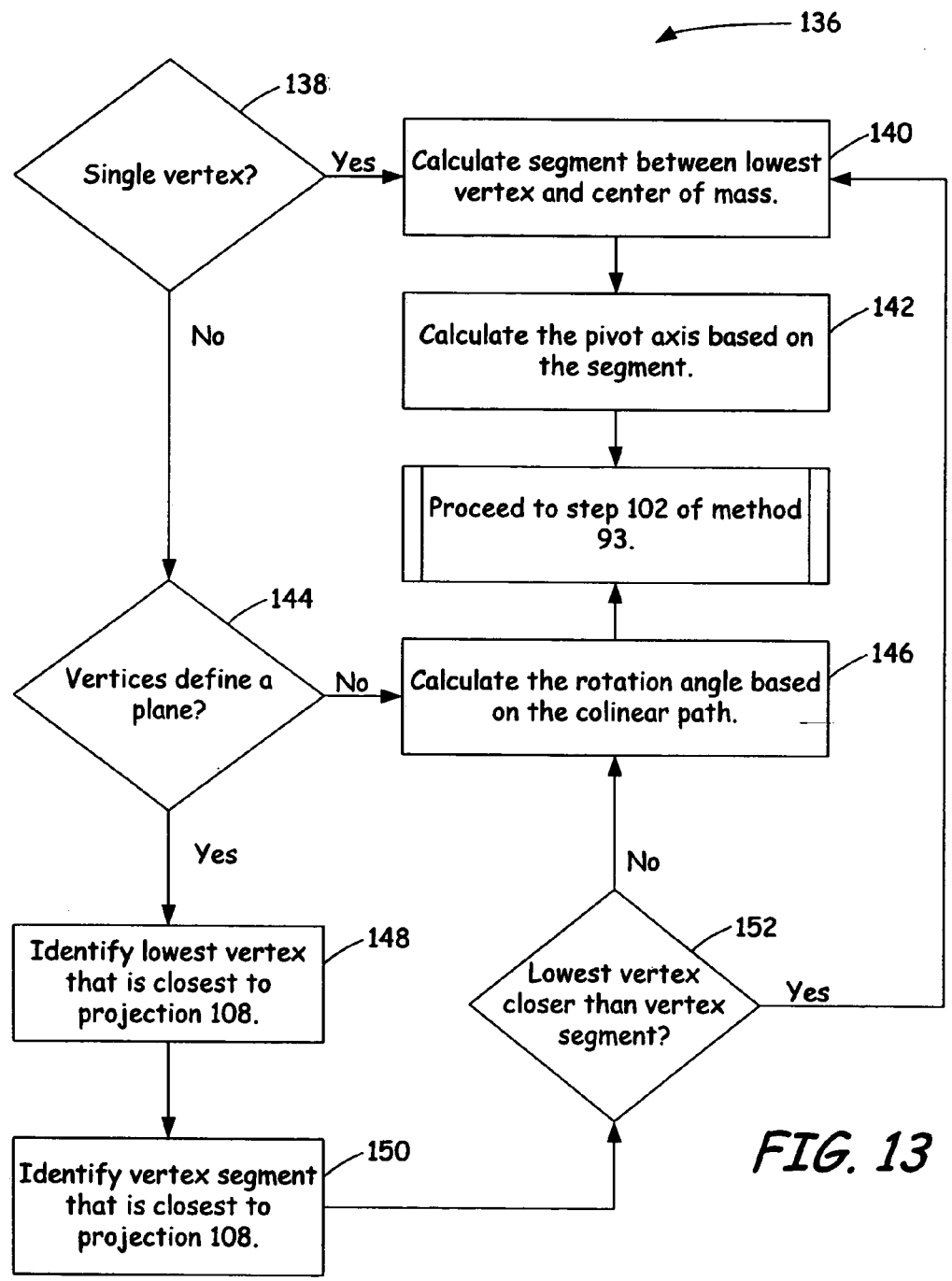
FIG. 13 is a block diagram of a method for calculating pivot axes for the CAD models shown in FIGS. 12A-12D.

FIG. 13 is a block diagram of method 136 for calculating a pivot axis, pursuant to step 100 of method 93. The following discussion of method 136 is initially made with reference to CAD model $10_D$ shown above in FIG. 12D. Method 118 includes steps 138-152, and initially involves determining whether CAD model $10_D$ has a single lowest vertex (step 138). In this example, CAD model $10_D$ has a single lowest vertex at tip 116. Therefore, the computer then calculates segment 132 between center of mass 70 and tip 116 (step 140).

The computer then calculates a pivot axis as an axis that (1) is perpendicular to segment 132, (2) lies in horizontal plane 88, and (3) and intersects tip 116 (step 142). This provides pivot axis 134, shown above in FIG. 10D. The computer then rotates center of mass 70 around pivot axis 134 until CAD model $10_D$ reaches a stable orientation, pursuant to step 102 of method 93 (shown above in FIG. 9).

Referring now to the example shown in FIG. 12C, the computer determines whether CAD model $10_C$ has a single lowest vertex (step 138). In this example, CAD model $10_C$ includes a pair of lowest vertices (i.e., vertices $114_A$ and $114_B$). Therefore, the computer then determines whether the lowest vertices of CAD model $10_C$ define a plane (i.e., at least three lowest vertices that are non-colinear) (step 144). As discussed above, vertices $114_A$ and $114_B$ define a line, rather than a plane. Therefore, the computer identifies a colinear path along vertices $114_A$ and $114_B$ (i.e., edge 114), and calculates a pivot axis as an axis that extends along the colinear path. This provides pivot axis 130, shown above in FIG. 10C. The computer then rotates center of mass 70 around pivot axis 130 until CAD model $10_C$ reaches a stable orientation, pursuant to step 102 of method 93 (shown above in FIG. 9).

Referring now to the example shown in FIGS. 12A and 12B, the computer determines whether CAD model $10_A$ has a single lowest vertex (step 138). In this example, CAD model $10_A$ includes four lowest vertices (i.e., vertices $86_A$-$86_D$). Therefore, the computer then determines whether the lowest vertices of CAD model $10_A$ define a plane (step 144). As discussed above, vertices $86_A$-$86_D$ define a plane having at least three lowest vertices non-colinear (i.e., surface 86).

Because the lowest vertices of CAD model $10_A$ define a plane, the computer then analyzes vertices $86_A$-$86_D$, and identifies which lowest vertex is closest to projection 108 of center of mass 70 (step 148). In this example, vertices $86_A$ and $86_D$ are equally close to projection 108. The computer then analyzes vertex segments $128_{AB}$, $128_{BC}$, $128_{CD}$, and $128_{AD}$, and identifies which vertex segment is closest to projection 108 of center of mass 70 (step 150). In this example, as shown above in FIG. 12B, vertex segment $128_{AD}$ is the closest vertex segment to projection 108 (represented by line 126 in FIG. 12B). The computer then determines whether the identified lowest vertex (i.e., vertex $86_A$ or $86_D$) is closer to projection 108 than the identified vertex segment (i.e., vertex segment $128_{AD}$) (step 152).

If the identified lowest vertex is closer to projection 108 than the identified vertex segment, then the computer would calculate a segment between the identified lowest vertex and center of mass 70, and calculate a pivot axis based on the segment, in the manner discussed above in steps 140 and 142. In the current example, however, vertex segment 128AD is closer to projection 108 than either vertex $86_A$ or $86_D$. Therefore, the computer identifies a colinear path along vertex segment $128_{AD}$, and calculates a pivot axis as an axis that extends along the colinear path, in the manner discussed above in step 146. This provides pivot axis 90, shown above in FIGS. 12A and 12B. After pivot axis 90 is calculated, the computer then rotates center of mass 70 around pivot axis 90 until CAD model $10_A$ reaches a stable orientation, pursuant to step 102 of method 93 (shown above in FIG. 9).

Figure 14A:
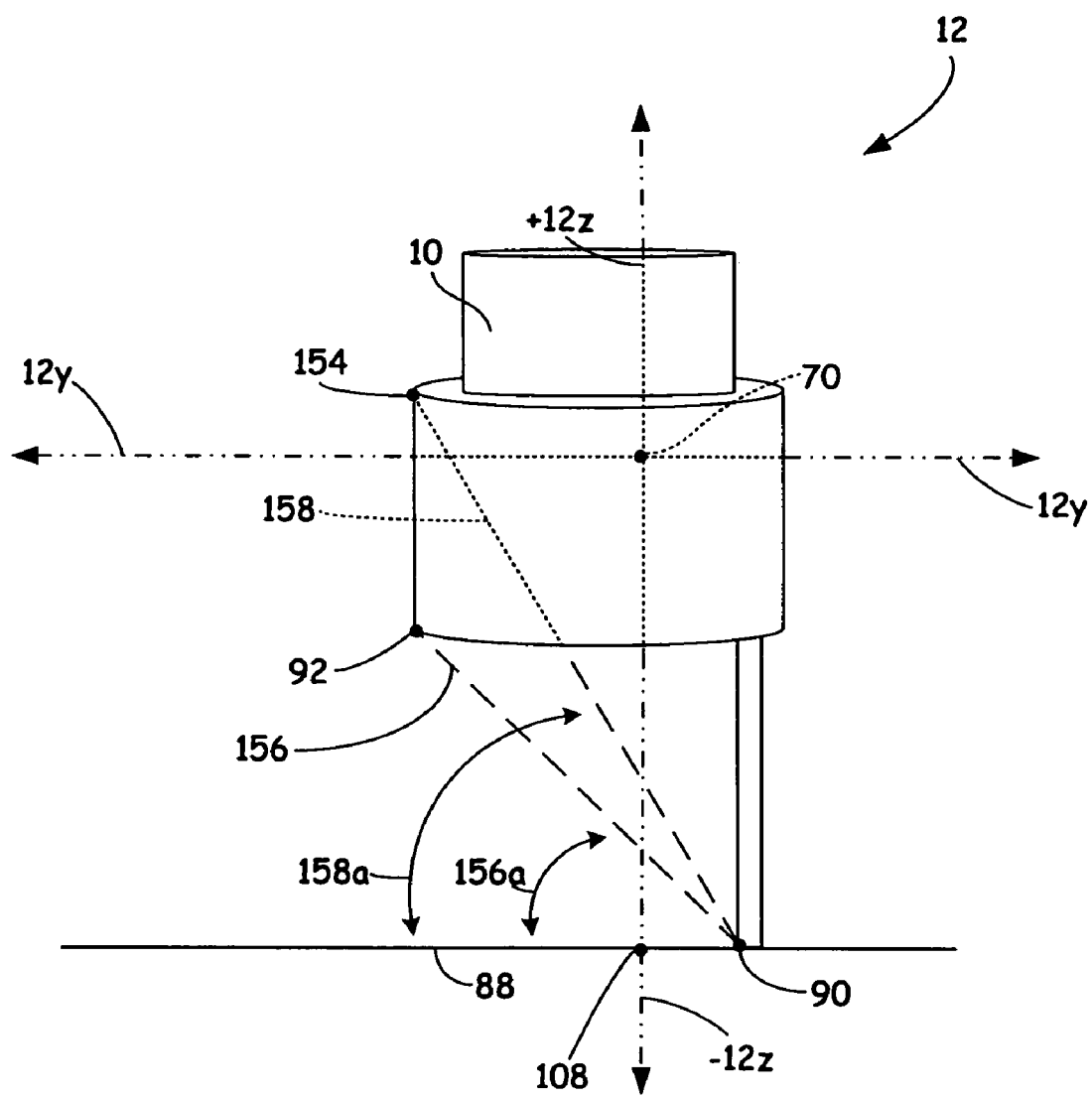
FIG. 14A is a side perspective view of the CAD model having an axially-aligned orientation in the Cartesian coordinate system, where an angle of rotation is being determined.
Figure 14B:
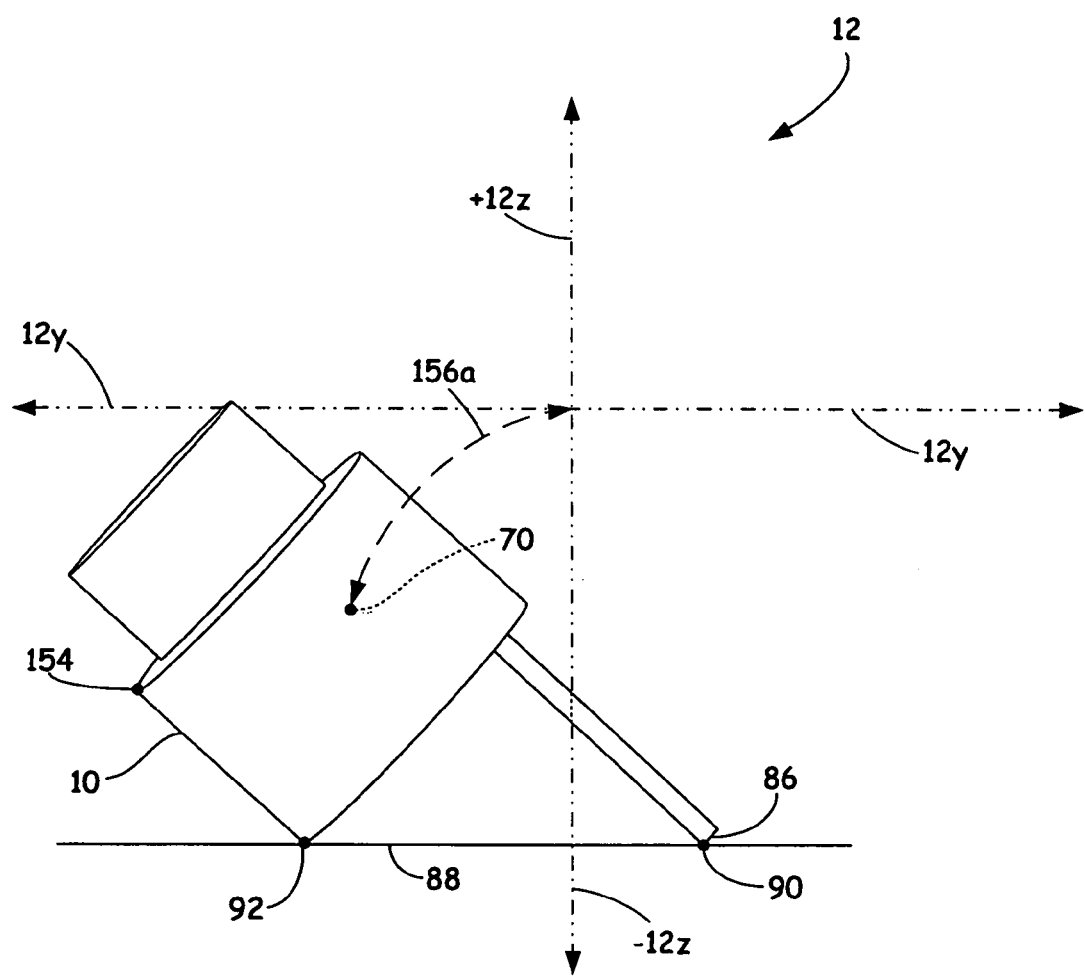
FIG. 14B is a side perspective view of the CAD model having a stable orientation in the Cartesian coordinate system after being rotated from the axially-aligned orientation shown in FIG. 14A.

FIGS. 14A, 14B, and 15 describe a suitable method for rotating CAD model 10 around pivot axis 90, pursuant to step 102 of method 93 (shown above in FIG. 9). FIGS. 14A and 14B are side views of CAD model 10 corresponding to CAD model $10_A$ shown above in FIG. 12A), which are provided to illustrate the method discussed below in FIG. 15.

As shown in FIG. 14A, the generated data further includes vertex 154, and segments 156 and 158. Vertex 154 is a second vertex of CAD model 10, similar to vertex 92. As generally noted above, and as shown in FIG. 14A, vertices 92 and 154 are examples of "non-lowest" vertices of CAD model 10. Segment 156 extends between pivot axis 90 and vertex 92, and is disposed at angle 156a from horizontal surface 88. Similarly, segment 158 extends between pivot axis 90 and vertex 154, and is disposed at angle 158a from horizontal surface 88.

FIG. 14B shows CAD model 10 in a stable orientation after center of mass 70 is rotated around pivot axis 90 by angle 156a. In the stable orientation, vertex 92 of CAD model 10 is positioned at horizontal plane 88.

FIG. 15 is a block diagram of method 160 for rotating CAD model 10 around pivot axis 90, and includes steps 162-174. Method 160 initially involves identifying a first "non-lowest" vertex on the exterior surface of CAD model 10 (step 162). As discussed above, the exterior surface of CAD model 10 contains multiple vertices (i.e., data points). Accordingly, during steps 162-170, the computer sequentially identifies each non-lowest vertex of CAD model 10.

The total number of non-lowest vertices identified may vary. For example, the computer may identify every non-lowest vertex of CAD model 10, and thereby calculate angles for every non-lowest vertex of CAD model 10. Alternatively, if CAD model 10 contains a large number of non-lowest vertices, the computer may limit the number of identified vertices, such as identifying an even distribution of non-lowest vertices, identifying a random set of non-lowest vertices, or by identifying non-lowest vertices grouped at a particular location of CAD model 10.

In this example, let us assume the first non-lowest vertex is vertex 154. The computer then calculates segment 158 between pivot axis 90 and vertex 154 (step 164), and calculates the angle between segment 158 and horizontal surface 88 (i.e., angle 158a) (step 166). As shown above in FIG. 14A, horizontal plane 88 extends to either side of pivot axis 90, along axis 12y. Accordingly, the side of horizontal plane 88 that the angle is based on (relative to pivot axis 90) is the side on which projection 108 is located. This is shown above as the left side of horizontal plane 88 in FIG. 14A.

The computer then checks whether the current non-lowest vertex (i.e., vertex 154) is the last non-lowest vertex of CAD model 10 (step 168). As discussed above, the number of identified non-lowest vertices of CAD model 10 may vary. At this point, there are additional non-lowest vertices that exist. Therefore, the computer proceeds to a next non-lowest vertex (step 170). Let us assume in this example that the next non-lowest vertex is vertex 92. The computer then repeats steps 164 and 166 for vertex 92, thereby providing segment 156 and angle 156a. The computer then repeats steps 164-168 for each vertex of the exterior surface of CAD model 10.

When the last non-lowest vertex is analyzed, the computer then identifies the lowest calculated angle between the segments and horizontal plane 88 (step 172). In the current example, angle 156a is the lowest angle calculated. As a result, the computer rotates center of mass 70 of CAD model 10 around pivot axis 90 by a number of degrees equal to angle 156a (step 174). This rotates CAD model 10 to the stable orientation shown above in FIG. 14B, where vertex 92 is positioned at horizontal surface 88. The computer then analyzes CAD model 10 in the stable orientation, based on the one or more criteria selected, pursuant to step 104 of method 92 (shown above in FIG. 9).

As discussed above, the methods discussed above in FIGS. 6A-15 are beneficial for identifying stable orientations of CAD model 10. This allows a resulting 3D object to be built in a physical orientation that corresponds to the given stable orientation of CAD model 10, thereby reducing the risk of the 3D object collapsing during the build process. Additionally, the methods are beneficial for limiting the number of spatial orientations that are analyzed (e.g., six axially-aligned orientations), which correspondingly limits the number of computations required by the computer.

As discussed above, the present invention may be used to identify final spatial orientations based on one or more criteria. Examples of suitable criteria include any type of measurable rapid manufacturing build property, such as reducing the build time, minimizing the Volume$_{rsm}$, improving the surface finish of the 3D object, increasing part strength of the 3D object, reducing footprint size (in the horizontal x-y plane), reducing the height of the 3D object (along axis 12z), improving fill patterns, obtaining user-specified orientations, improving material selections, and combinations thereof. The following discussion provides some examples of suitable techniques for analyzing given spatial orientations based on particular criteria:

1. Minimizing the Required Volume of Support Material

When creating 3D objects by rapid manufacturing techniques that involve deposition processes (e.g., fused deposition modeling and ink jetting), support structures may be used underneath overhanging portions or in cavities of the 3D objects under construction, which are not directly supported by the build material itself. Support structures may be built utilizing the same rapid manufacturing techniques and systems by which the build material is deposited.

The use of support structures to support overhanging portions of 3D objects substantially increases build times due to data generation and deposition of the support layers. In general, the build time is proportional to the Volume$_{rsm}$. Therefore, it is desirable to position CAD model 10 in a spatial orientation that minimizes the Volume$_{rsm}$.

The Volume$_{rsm}$ for a given spatial orientation of CAD model 10 is calculated by generating support columns under each overhanging portion. Suitable techniques for generating support columns for CAD models are discussed in Crump et al., U.S. Pat. No. 5,503,785, Abrams et al., U.S. Pat. No. 5,587,913. A particularly suitable technique for generating support columns is provided by rapid manufacturing software under the trade designation "INSIGHT" from Stratasys, Inc., Eden Prairie, Minn. The computer then measures the total volume of the generated support columns for the given spatial orientation. These measured volumes are the analyzed results that are subsequently compared in step 38 of method 24 (shown above in FIG. 3).

2. Improving Surface Finish 3D objects built by rapid manufacturing techniques generally exhibit "stair step" appearances, particularly at curved or angled exterior surfaces. The stair stepping effect is caused by the layering of cross-sectional shapes that have square-edge profiles, and is more pronounced as layer thicknesses increase. While the stair stepping effect generally does not affect the strengths of the 3D objects, it may significantly diminish the aesthetic qualities.

One aspect of surface finish of a 3D object is based on curved or angled surfaces that extend vertically along axis 12z, thereby creating the stair step appearance. Surface finish may be improved by minimizing the surface areas of curved or angled surfaces extending vertically. Accordingly, during step 62, the computer measures the total surface area of the curved or angled surfaces of CAD model 10 for the given spatial orientation. The measured surface areas are the analyzed results that are subsequently compared in step 38 of method 24.

3. Increasing Part Strength

The part strength of a 3D object may be affected by the generated build paths used during the build process, particularly at thin part locations. Accordingly, in this embodiment, the computer scans the given spatial orientation and identifies particular factors that may affect the strength of the 3D object, such as build path vector directions at thin part locations. In step 38 of method 24, the computer then compares the spatial orientations to determine which increase or decrease the part strength.

4. Reducing the Footprint Size

Reducing the footprint size of CAD model 10 in the horizontal x-y plane is beneficial for optimizing the build space in a rapid manufacturing system. This allows multiple 3D objects to be built during a single build process. Accordingly, in this embodiment, the computer measures the horizontal area of CAD model 10 over a plurality of increments along the axis 12z for the given spatial orientation. The computer then records the widest areas measured for each spatial orientation, which are subsequently compared in step 38 of method 24.

5. Reducing Vertical Height

Reducing the height of the 3D object along axis 12z is beneficial for reducing the number of vertical increments required to build the 3D object, which is another factor that affects build time during rapid manufacturing. Accordingly, the computer measures the distance along axis 12z between the highest vertex and the lowest vertex of CAD model 10 for the given spatial orientation. The distances are then compared in step 38 of method 24.

6. Improving Fill Patterns

When generating build paths for the sliced layers, small void regions may appear between generated paths due to resolution limitations. These void regions may result in small cavities being formed between the deposited roads of build material, which correspondingly increases the porosity of the resulting 3D objects, thereby reducing the structural integrities of the resulting 3D objects. Accordingly, in this embodiment, the computer measures the number and volume of void regions that appear in the build paths for the given spatial orientation. An example of a suitable technique for identifying small void regions is disclosed in Holzwarth, U.S. patent application Ser. No. 11/343,355, which is entitled "Method For Building Three-Dimensional Objects With Extrusion-Based Layered Deposition Modeling", and is published as U.S. Patent Application Publication No. 2007/0179657. Alternatively, the computer may identify known geometric factors that typically result in small void regions being formed.

As discussed above, method 14 of the present invention is beneficial for optimizing the spatial orientations of CAD models (e.g., CAD model 10) based on one or more criteria (e.g., minimizing the Volume$_{rsm}$). As a result, the physical characteristics of the resulting 3D object may be improved and/or the build performance during the rapid manufacturing may be improved.

Figure 16:
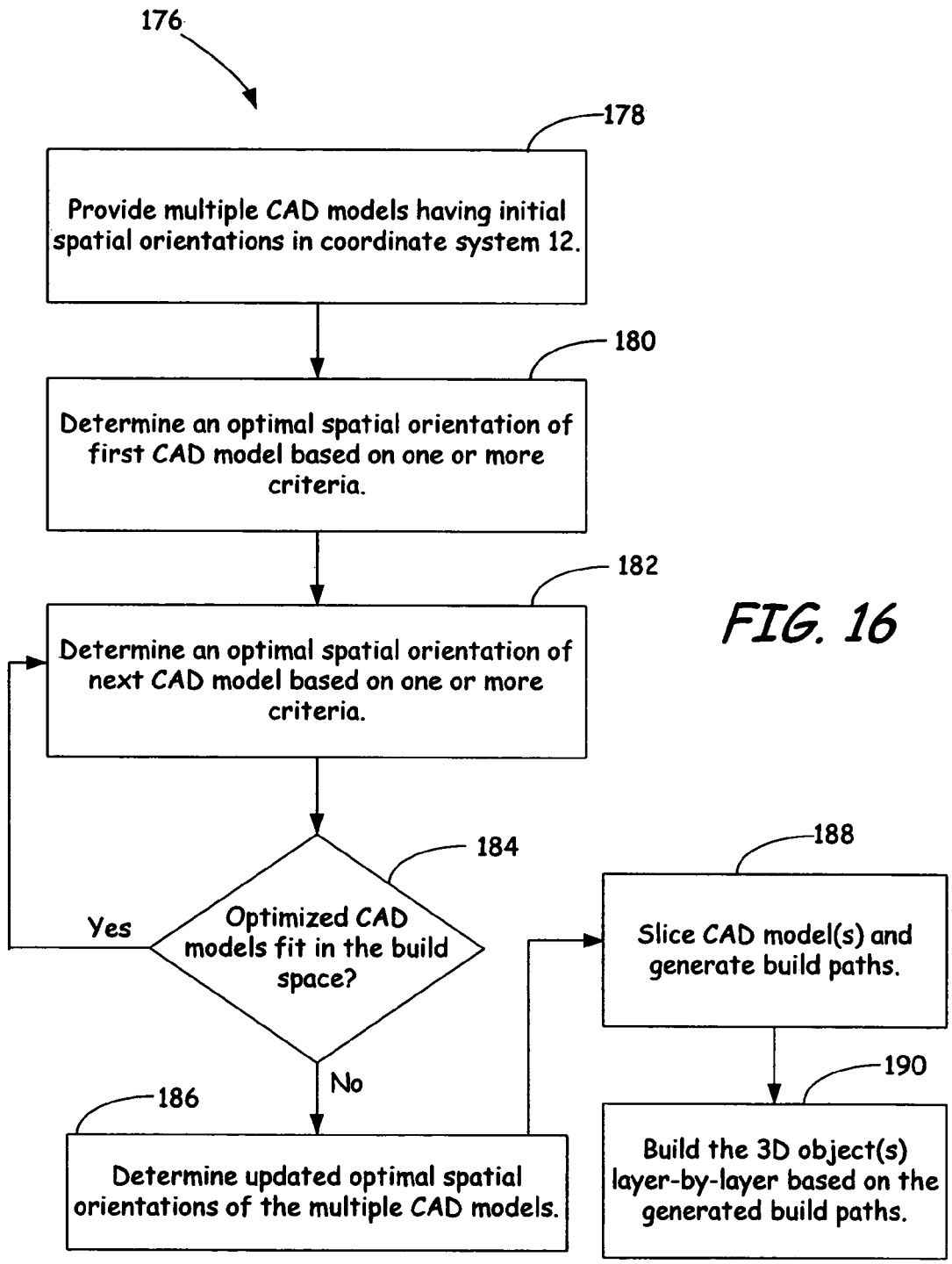
FIG. 16 is a flows diagram of a suitable system for performing the method of the present invention.

FIG. 16 is a block diagram of method 176, which is an alternative method for building multiple 3D objects pursuant to techniques discussed above for method 14. Method 176 includes steps 178 and 180, and initially involves providing multiple CAD models of 3D objects, where it is desired to build as many of the multiple 3D objects in a build space of a rapid manufacturing system during a single build cycle (step 178). The computer then determines an optimal spatial orientation for a first and second CAD model in the same manner as discussed above in step 18 of method 14 (steps 180 and 182).

The computer then determines whether the second CAD model fits within the build space with the first CAD model (step 184). This determination is based on the footprint size of the first and second CAD models. If both CAD models fit within the build space, then the computer repeats step 182 for a third CAD model, and determines whether the optimized third CAD model also fits within the build space with the first and second CAD models (step 184). Steps 182 and 184 are repeated until there are no additional CAD models to be built or if no additional CAD models will fit within the build space.

The computer then determines updated optimal spatial orientations for the CAD models that fit within the build space based on the one or more selected criteria (step 186). This is performed in the same manner as discussed above in step 18 of method 14 except that relative locations of the multiple CAD models may also be taken into consideration (e.g., for reducing the $Volume_{rsm}$.

The computer then slices the one or more CAD models and builds the 3D objects in the same manner as discussed above in steps 20 and 22 of method 14 (steps 188 and 190), thereby building multiple 3D objects in a single build cycle. Accordingly, method 176 is beneficial for increasing the number of CAD models that may be built in a single build cycle, and is particularly suitable when analyzing the CAD models based on the criteria of reducing the footprint area of the CAD models.

FIG. 17 is a flow diagram of system 192 for building 3D objects pursuant to method 14, with the various embodied steps, as discussed above. System 192 includes computer 194, and rapid manufacturing system 196, which communicate with each other via line 198. Computer 194 may be any type of computer-based system that is capable of directly or indirectly communicating with one or more rapid manufacturing systems, and may include printer server operations, 3D CAD environments, and client environments.

Computer 194 may receive CAD model 10 in the initial spatial orientation from a variety of sources (e.g., network lines), or CAD model 10 may be generated in the initial spatial orientation with computer 194. In either situation, computer 194 retains CAD model 10 in the initial spatial orientation. Computer 194 then performs steps 16-20 of method 14 (shown above in FIG. 2), including any of the suitable methods discussed above in FIGS. 3A-16, and relays the generated build paths to rapid manufacturing system 196 via line 198.

Rapid manufacturing system 196 is a system for building 3D objects by one or more layer-based additive techniques. Examples of suitable system for rapid manufacturing system 196 include fused deposition modeling systems (e.g., systems commercially available under the trade designation "FDM" from Stratasys, Inc., Eden Prairie, Minn.), ink jetting systems, selective laser sintering systems, electron-beam melting systems, and stereolithographic systems.

Once the generated build paths are received, rapid manufacturing system 196 then builds a 3D object based on CAD model 10 having an optimal spatial orientation in coordinate system 12, based on the one or more criteria selected. The optimized spatial orientation of CAD model 10 thereby improves build performance during the rapid manufacturing based on the one or more criteria selected.

Although the present invention has been described with reference to preferred embodiments, workers skilled in the art will recognize that changes may be made in form and detail without departing from the spirit and scope of the invention.

The invention claimed is:

1. A method for building a three-dimensional object, the method comprising:
   aligning a plurality of primary axes of a computer-aided design (CAD) model of the three-dimensional object with a vertical axis of a coordinate system, thereby positioning the CAD model in a plurality of axially-aligned orientations in the coordinate system;
   positioning the CAD model from the plurality of axially-aligned orientations to second spatial orientations in the coordinate system, wherein the CAD model is positionably stable in each of the second spatial orientations;
   analyzing the CAD model in the second spatial orientations based on one or more criteria to provide analyzed results; and
   comparing the analyzed results to identify a final spatial orientation of the CAD model for building the three-dimensional object.

2. The method of claim 1, wherein positioning the CAD model to the second spatial orientations comprises determining whether the CAD model is positionably stable at the axially-aligned orientations.

3. The method of claim 2, wherein positioning the CAD model to the second spatial orientations further comprises rotating the CAD model from at least one of the axially-aligned orientations to one of the second spatial orientations.

4. The method of claim 2, wherein positioning the CAD model at the second spatial orientations further comprises:
   calculating a center of mass of the CAD model;
   calculating a pivot axis for the CAD model positioned at one of the axially-aligned orientations based in part on the center of mass of the CAD model; and
   rotating the center of mass of the CAD model around the pivot axis.

5. The method of claim 1, wherein the one or more criteria are selected from the group consisting of reducing build time, minimizing a required volume of support material to build the three-dimensional object, improving surface finish of the three-dimensional object, increasing part strength of the three-dimensional object, reducing footprint size, reducing a height of the three-dimensional object, improving fill patterns, obtaining user-specified orientations, improving material selections, and combinations thereof.

6. The method of claim 1, wherein the analyzing comprises calculating a required volume of support material for each of the second spatial orientations.

7. A system for building a three-dimensional object based on a computer-aided design (CAD) model of the 3D object, the system comprising:
   a computer configured to retain the CAD model in a coordinate system, wherein the computer is further configured to calculate a plurality of primary axes of the CAD model, to align the plurality of primary axes of the CAD model with a vertical axis of the coordinate system, to position the CAD model at second spatial orientations in the coordinate system in which the CAD model is positionably stable, to analyze the CAD model in the second spatial orientations based on one or more criteria, and to identify a final spatial orientation of the CAD model for building the three-dimensional object based at least in part on the analysis of the CAD model in the second spatial orientations; and a rapid manufacturing system configured to communicate with the computer and to build the three-dimensional object based on the final spatial orientation of the CAD model.

8. The system of claim 7, wherein the computer is further configured to slice the CAD model in the final spatial orientation into a plurality of sliced layers, and to generate build paths for the sliced layers.

9. The system of claim 7, wherein the one or more criteria are selected from the group consisting of reducing build time, minimizing a required volume of support material to build the three-dimensional object, improving surface finish of the three-dimensional object, increasing part strength of the three-dimensional object, reducing footprint size, reducing a height of the three-dimensional object, improving fill patterns, obtaining user-specified orientations, improving material selections, and combinations thereof.

10. The system of claim 7, wherein the computer is configured to determine the final spatial orientation by calculating a required volume of support material for the CAD model in the second spatial orientations.

11. The system of claim 7, wherein the computer is further configured to assign one or more factors to the one or more criteria, the one or more factors being selected from the group consisting of a relative weight, a threshold, and a combination thereof.

12. A method for building one or more three-dimensional objects, the method comprising:
    providing a computer-aided design (CAD) model of a three-dimensional object in a coordinate system, the coordinate system comprising a vertical axis;
    calculating a plurality of primary axes of the CAD model;
    positioning the CAD model at a first spatial orientation in which a first primary axis of the plurality of primary axes is aligned with the vertical axis of the coordinate system;
    repositioning the CAD model from the first spatial orientation to a second spatial orientation in which the CAD model is positionably stable;
    analyzing the CAD model in the second spatial orientation based on one or more criteria; and
    identifying a final spatial orientation of the CAD model for building the three-dimensional object based at least in part on the analysis of the CAD model in the second spatial orientation.

13. The method of claim 12, wherein the plurality of primary axes of the CAD model are each calculated as a function of one or more variables selected from the group consisting of a center of mass of the CAD model and an inertial tensor of the CAD model.

14. The method of claim 12, further comprising assigning one or more factors to the one or more criteria, the one or more factors being selected from the group consisting of a relative weight, a threshold, and a combination thereof.

15. The method of claim 12, wherein the one or more criteria are selected from the group consisting of reducing build time, minimizing a required volume of support material to build the three-dimensional object, improving surface finish of the three-dimensional object, increasing part strength of the three-dimensional object, reducing footprint size, reducing a height of the three-dimensional object, improving fill patterns, obtaining user-specified orientations, improving material selections, and combinations thereof.

16. The method of claim 12, wherein analyzing the CAD model in the second spatial orientation comprises calculating a required volume of support material for the CAD model in the second spatial orientation.

17. The method of claim 12, wherein the vertical axis of the coordinate system has a positive vector and a negative vector, wherein positioning the CAD model at the second spatial orientation aligns the first primary axis with the positive vector of the vertical axis, and wherein the method further comprises:
    positioning the CAD model at a third spatial orientation in which the first primary axis is aligned with the negative vector of the vertical axis;
    repositioning the CAD model from the third spatial orientation to a fourth spatial orientation in which the CAD model is positionably stable; and
    analyzing the CAD model in the fourth spatial orientation based on the one or more criteria, wherein identifying the final spatial orientation is further based at least in part on the analysis of the CAD model in the fourth spatial orientation.

18. The method of claim 12, further comprising:
    positioning the CAD model at a third spatial orientation in which a second primary axis of the plurality of primary axes is aligned with the vertical axis of the coordinate system;
    repositioning the CAD model from the third spatial orientation to a fourth spatial orientation in which the CAD model is positionably stable; and
    analyzing the CAD model in the fourth spatial orientation based on the one or more criteria, wherein identifying the final spatial orientation is further based at least in part on the analysis of the CAD model in the fourth spatial orientation.

19. The method of claim 12, wherein repositioning the CAD model from the first spatial orientation to the second spatial orientation comprises:
    calculating a center of mass of the CAD model;
    calculating a pivot axis for the CAD model positioned at the first spatial orientation based in part of the center of mass of the CAD model; and
    rotating the center of mass of the CAD model around the pivot axis.

20. The method of claim 12, further comprising:
    positioning the CAD model in the spatial orientation for building the three-dimensional object;
    slicing the CAD model into a plurality of sliced layers while the CAD model is positioned in the spatial orientation for building the three-dimensional object;
    generating build paths for the sliced layers; and
    building the three-dimensional object with a rapid manufacturing system based on the build paths.

21. The method of claim 12, wherein the CAD model is a first CAD model, and wherein the method further comprises:
    providing a second CAD model of a second three-dimensional object in the coordinate system;
    positioning the second CAD model in a third spatial orientation in which the second CAD model is positionably stable;
    analyzing the second CAD model in the third spatial orientation based on the one or more criteria; and
    determining an updated spatial orientation of the first CAD model in the coordinate system based at least in part on the final spatial orientation of the first CAD model and on the analysis of the second CAD model in the third spatial orientation.

* * * * *

UNITED STATES PATENT AND TRADEMARK OFFICE
CERTIFICATE OF CORRECTION

PATENT NO. : 7,403,833 B2  
APPLICATION NO. : 11/396792  
DATED : July 22, 2008  
INVENTOR(S) : Heide et al.

Page 1 of 1

It is certified that error appears in the above-identified patent and that said Letters Patent is hereby corrected as shown below:

Column 10, line 22 change "10A-10D" to --$10_A$-$10_D$--.

Signed and Sealed this

Thirtieth Day of December, 2008

JON W. DUDAS  
*Director of the United States Patent and Trademark Office*